United States Patent
Bailey et al.

(10) Patent No.: US 6,347,527 B1
(45) Date of Patent: Feb. 19, 2002

(54) INTEGRATED SYSTEM FOR HEATING, COOLING AND HEAT RECOVERY VENTILATION

(76) Inventors: Louis J. Bailey, 15082 Ilderton Road, R.R. #3, Ilderton, Ontario (CA), N0M 2A0; Ralph Haan, R.R. #7, Strathroy, Ontario (CA), N7G 3H8

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/203,567

(22) Filed: Dec. 2, 1998

Related U.S. Application Data

(60) Provisional application No. 60/067,141, filed on Dec. 2, 1997.

(51) Int. Cl.[7] .................................................. F25B 29/00
(52) U.S. Cl. ...................... 62/238.7; 62/238.6; 62/90; 62/91; 62/260; 62/324.1; 165/54; 165/45; 165/59; 237/2 B
(58) Field of Search .............................. 62/238.7, 238.6, 62/90, 91, 260, 324.1; 165/54, 45, 59; 237/2 B

(56) References Cited

U.S. PATENT DOCUMENTS

| | | | |
|---|---|---|---|
| 4,071,080 A | | 1/1978 | Bridgers |
| 4,414,818 A | | 11/1983 | Turbard et al. |
| 4,459,816 A | * | 7/1984 | Lung et al. ................. 62/324.1 |
| 4,489,568 A | * | 12/1984 | Shapess ...................... 62/324.1 |
| 4,550,773 A | * | 11/1985 | Martin ......................... 165/54 |
| 4,747,273 A | | 5/1988 | Cook et al. |
| 4,920,757 A | * | 5/1990 | Gazes et al. ............... 62/324.1 |
| 5,257,736 A | * | 11/1993 | Roy ............................. 165/54 |
| 5,461,876 A | * | 10/1995 | Dressler .................... 62/238.7 |
| 5,490,557 A | * | 2/1996 | Taylor ......................... 165/54 |
| 5,829,513 A | * | 11/1998 | Urch ........................... 165/54 |

FOREIGN PATENT DOCUMENTS

| | | | | |
|---|---|---|---|---|
| DE | 2360068 | * | 10/1975 | .................... 165/54 |
| DE | 2939393 | * | 5/1981 | ........... 165/47 BW |
| DE | 3027447 | * | 2/1982 | .................... 165/54 |
| GB | 2 215 833 A | | 9/1989 | |
| GB | 2 293 441 A | | 3/1996 | |
| JP | 0147240 | * | 6/1989 | .................... 165/54 |
| JP | 0163545 | * | 6/1989 | .................... 165/54 |
| JP | 1-306738 | * | 12/1989 | ........ 165/FOR 123 |
| JP | 2-44142 | * | 2/1990 | ........ 165/FOR 123 |
| JP | 4-106333 | * | 4/1992 | ........ 165/FOR 107 |
| JP | 4-106334 | * | 4/1992 | ........ 165/FOR 107 |
| JP | 4-106335 | * | 4/1992 | ........ 165/FOR 107 |
| JP | 6-129673 | * | 5/1994 | ........ 165/FOR 123 |
| JP | 6-213479 | * | 8/1994 | ........ 165/FOR 107 |
| WO | WO 81/00616 A1 | | 3/1981 | |
| WO | WO 87/01436 A1 | | 3/1987 | |
| WO | WO 96/27767 | | 9/1996 | |

\* cited by examiner

*Primary Examiner*—John K. Ford
(74) *Attorney, Agent, or Firm*—R. Craig Armstrong

(57) ABSTRACT

An integrated compression based heating/cooling, humidification and mid or high efficiency heat recovery ventilation system is provided. The integrated system is a centralized apparatus that offers a very efficient method for heating/cooling with more winter and summer humidity control plus offering heat recovery ventilation in a structure having a regulated indoor temperature and specific ventilation/energy recovery rate. The heating and cooling section of the apparatus would most commonly be configured as a forced air geothermal or air-to-air heat pump. The heat recovery ventilation section of the apparatus will incorporate a heat recovery chamber complete with a primary passive cross flow heat recovery core. Plus, a secondary refrigeration based high efficiency reversible energy recovery evaporator/condenser coil. The integrated system will also incorporate a humidification system designed to operate during the winter heating season.

13 Claims, 11 Drawing Sheets

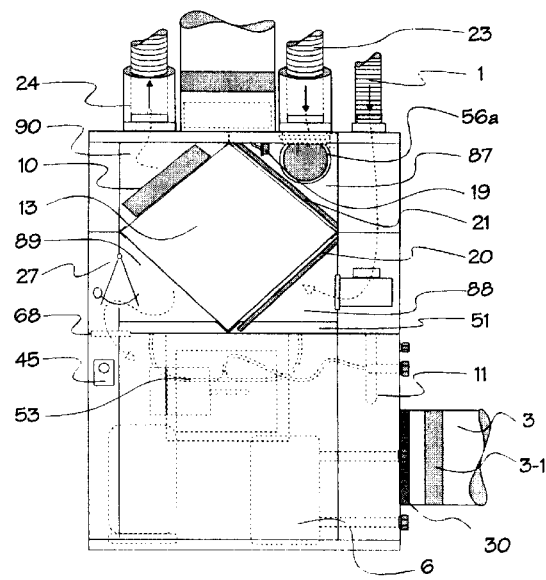
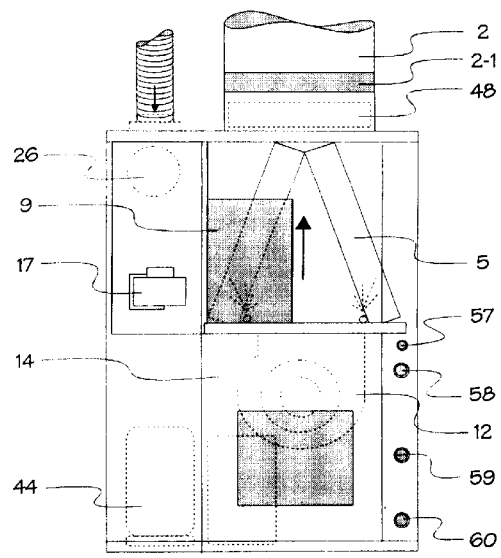
fig. 2-1
fig. 2-2
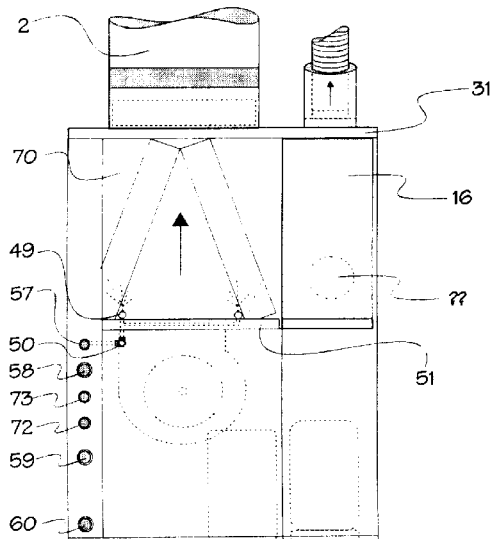
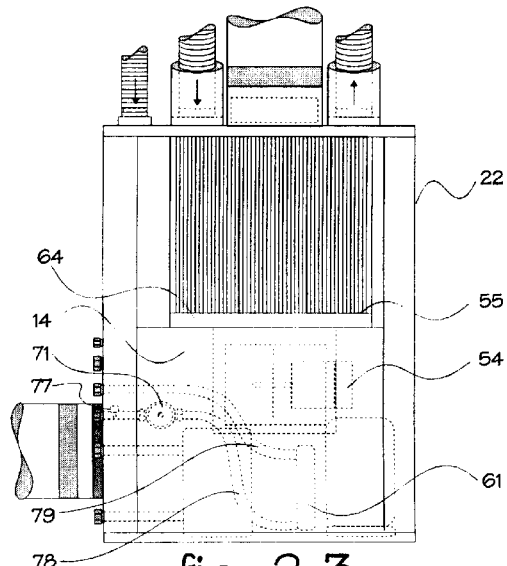
fig. 2-4
fig. 2-3
fig. 2

INTEGRATED SYSTEM FOR HEATING, COOLING AND HEAT RECOVERY VENTILATION

BACKGROUND OF THE INVENTION

This Application claims benefit of Provisional Application No. 60/067,141 filed Dec. 2, 1997

FIELD OF THE INVENTION

This invention relates to systems for heating, cooling, humidification and heat recovery ventilation.

DESCRIPTION OF THE PRIOR ART

To date, heating, cooling, humidification and heat recovery ventilation (HRV) have been accomplished by using three or even four separate pieces of equipment. In the situation where four pieces of equipment are used, the common method would include a standard fossil fuel type furnace, a central or window air-to-air type air conditioner, a duct mounted humidifier and a heat recovery ventilator (HRV). When three pieces of equipment are used the heating and cooling system would be one of the components, generally referred to as a geothermal or air-to-air reversible heat pump, while the humidification and heat recovery ventilation would be accomplished with two separate pieces of equipment. In the aforementioned instances the ducting, condensate draining, wiring, fusing and controls are needed for each system individually. There is no way to increase the efficiency with existing systems because they are separate components, so the capital cost and operating efficiencies which could be gained by integration are not available.

The presently available HRV equipment commonly uses a passive cross-flow core or a desiccant wheel core or a Freon-filled direct exchange core, complete with various types of defrost methods. The defrost methods presently available include an electric defrost or various configurations of damper defrost. The electric defrost element which is usually located in the fresh air supply stream generally starts to operate at approximately –5 degrees C. (23 degrees F.). It will then cycle on and off until –15 degrees C. (5 degrees F.) at which time it is on until the temperature warms up to above –15 degrees C. (5 degrees F.). The electric defrost method is obviously inefficient from an operating cost perspective because of the cost to run the electrical elements. The damper type defrost is more widely accepted, as the method of choice. However, there are drawbacks to the existing systems. One method of damper defrost includes closing a damper on the fresh air intake while opening a damper to draw pre-warmed air from the inside of the space. As the pre-warmed air flows through the HRV core, it defrosts the core. Since the exhaust motor still continues to operate, this method causes an unbalanced system, causing a negative pressure in the space while the system is in the defrost mode. Another damper defrost method includes opening a damper within the HRV and re-directing the stale air to the outside to the fresh air intake section. Although this system does not cause the unwanted negative pressure problem, it will cause a problem where the stale exhaust air will be sent to the living area of the space along with all odors common in stale air.

Present day humidifiers use several methods of humidification and controls. The most common type of humidifier includes a return air duct mounted system complete with a humidistat for control. For example, when the humidity level drops to 45% in the winter, the humidistat sends power from an externally mounted transformer to a small, slowly revolving 24V motor which is attached to a wheel wrapped in a sponge-like material (sponge wheel). The sponge wheel is slightly immersed in a water pan. The water is normally taken from a saddle tee located on one of the water lines close to the unit. The sponge wheel soaks up some of the water from the pan as it is revolving. When the pan's water level drops below a pre-set level, then a shut-off float mechanism, mounted to the pan, opens to allow more water into the pan. As the pan fills with water, the float closes and stops, allowing water to flow into the pan. When the return air runs over the sponge wheel, it pulls some of the water into the air stream, thus humidifying the air stream and thereby increasing the humidity level within the space. This system can cause moisture problems which generally result from calcification of the float control and sponge wheel. Control problems and water leakage into the furnace are common within presently offered humidifiers.

It is presently well known that heating and cooling can be accomplished with a geothermal or air-to-air compression-based heating and cooling system, or a reversible, mechanical vapor compression system, hereinafter referred to simply as "heat pumps". These reversible, mechanical vapor compression systems or heat pump systems have been utilized to accomplish the goal of efficiently heating and cooling together within a unitary reversible system. An air-to-air heat pump absorbs energy and rejects energy to the outdoor air. The application for an air-to-air heat pump in northern climates is limited because when the outdoor air temperature drops below a prescribed level (usually 40 degrees F.), the system cannot pump any further heat out of the air. The cooling side of an air-to-air heat pump does not offer the highest efficiency as achieved with a geothermal heat pump, but can be effective in most temperature ranges. The capital cost of an air-to-air heat pump is lower but again the operating efficiencies suffer in comparison to a geothermal heat pump. Although the capital cost is higher, the popularity of geothermal heat pumps has grown dramatically over the years because of the constant underground temperature and the much higher efficiency levels.

At present, a geothermal heat pump absorbs and rejects energy from underground or fresh water source, in distinctly different ways. It either uses a closed horizontal or vertical ground or lake loop, or it can absorb or reject energy directly from a domestic well or water source on the property. Together, these are hereinafter referred to as "geothermal underground energy sources".

If the geothermal underground energy source is based on a horizontal closed loop method it includes the use of polyethylene pipe, which is buried in trenches in a horizontal configuration in rows or circuits approximately one foot below the frost level. A closed lake or river loop uses the same polyethylene pipe, but instead of burying the pipe underground as with a horizontal loop, it is simply sunk to the bottom of the. river or lake and adhered to a pre-configured plastic fence matting material. A vertical closed loop involves drilling bore holes down into the ground, all to the same specific depths, inserting polyethylene pipe into the bore holes and connecting them as circuits inside of a trench which links each set of pipes. The circuits are designed to reduce pressure drop to an acceptable level thereby causing the appropriate flow rates. The loop is hooked to two three-way purging valves at the unit. One or two low-voltage pumps are installed in the loop to cause the flow of the liquid within the closed loop. The fluid that is commonly used in a closed loop system includes a mixture of an environment-friendly and government-approved anti-freeze solution along with water. The water and anti-freeze solution is pumped from and to a Freon-to-liquid evaporator/condenser (hereinafter referred to as a "liquid heat exchanger"), by the low voltage pumps at a specified flow rate, causing specific energy absorption or rejection, depending on the mode of operation. The liquid heat exchanger uses Freon within a refrigeration system to pump the energy from the geothermal underground energy source to the indoor Freon-to-air heat exchanger.

If the geothermal energy source is based on an open-well water source, or internal loop in a commercial building water source, the common method of absorbing or rejecting energy is to hook the liquid heat exchanger directly to the available water source. The water is usually pumped in and out of the liquid heat exchanger by the pre-existing water pressure system. In the case of a commercial building which uses an internal closed loop system, the water would be piped and pumped via the pre-existing system. In the case of a residential application in a rural setting the existing well pump would be used to pump water from the well into and out of the Freon-to-liquid heat exchanger at a prescribed flow rate. Then it is sent to a discharge point somewhere else on the property but at the same aquifer level. When the discharge is pumped out to the same aquifer level, it is generally believed that the water will make its way underground back to the well after it picks up energy from underground. In a situation where a geothermal heat pump (sometimes called a water source heat pump) is used in a high rise or a zoned commercial complex there are various methods of taking advantage of the underground energy sources as well as above-ground energy sources. In this case the geothermal or water source heat pump is used as an energy transfer mechanism where a unit is placed in each zone and tied to a common underground loop, common internal loop, or open-well system. There are presently many such applications in existence.

A geothermal heat pump is considered very reliable, given that ground and underground water temperatures do not generally fluctuate to the same extent as outdoor air temperatures. An air-to-air heat pump offers a co-efficient of performance (COP) compared to electric heating of approximately 1.8 to 1, depending on outdoor temperature conditions. However, when the outdoor air temperature drops below a specified level, then the heating side of an air-to-air system switches over to straight electric, thereby reducing the efficiency to a COP of 1 to 1. The same is true for an air-to-air system in the cooling mode; when the air temperature increases beyond 95 degrees F. outdoors, the COP is lowered. A geothermal heat pump offers a much higher COP, approximately 3.5 to 1, regardless of the outdoor temperatures.

Again, although the capital cost of a geothermal or water source heat pump is higher than for an air-to-air heat pump, the operating cost savings of geothermal make it a wise choice. However, both systems make economic sense under the right conditions. Both configurations are referred to herein as "heat pump or reversible vapor compression systems, or reversible compression based heating and cooling systems".

Regarding HRV systems, "sick building syndrome" has become a common term within the building industry. It relates to the fact that as the thermal envelopes of buildings are getting tighter (higher R-values, better air barriers, therefore less air leakage), the possibility of stale air causing health problems for the occupants is much more prevalent and a major concern to designers. A tight building will also cause a problem when humidity stays in the building and is not properly ventilated. Humidity can cause significant degradation to the building itself. Humidity problems are well documented and generally accepted as a design issue in most building codes (residential and commercial). Humidity will come from several sources including the occupants. These problems demand ventilation. As ventilation is incorporated into the building designs, the recovery of energy becomes more and more important, as a cost and efficiency issue and in most cases necessary by the various municipal building codes. Although there are many, many environmental benefits, the product must make economic sense.

SUMMARY OF THE INVENTION

In view of the above, it is an object of the invention to provide an integrated system for heating, cooling and heat recovery ventilation, in which a heat pump or a reversible vapor compression system or a compression based heating and cooling system is integrated with a high efficiency heat recovery ventilation system, and optionally with an on-board humidification system.

The heat recovery ventilation section of the equipment offers either a base efficiency passive cross flow air-to-air heat exchanger core (hereinafter referred to by the abbreviation "PCAAHEC") and if required, a secondary high-efficiency, active, reversible refrigeration based evaporator/condenser heat exchanger. The preferred compression based heating and cooling system portion uses geothermal energy, but the invention is also applicable to the use of an air-to-air heat pump. Both systems make economic sense under the right conditions.

Since only one supply air ducting system is used, the integrated system offers every room in the occupied space a proportionate amount of pre-mixed fresh air without the need for two sets of ducts.

Besides offering the standard primary cross flow heat exchange core, the integrated system can incorporate an optional, high efficiency secondary active refrigerant based energy recovery coil within the ventilation function of the system. The secondary active refrigerant based energy recovery core would only be used when the compression based heating, cooling system is operating.

The capital cost and operating efficiencies will increase in the heat recovery, heating and cooling modes over that which is presently available as separate components because of the integration. The system will very efficiently heat, cool and ventilate at a prescribed rate while simultaneously extracting energy prior to the stale air removal. Variously configured defrost methods can be employed without causing the negative pressure and/or odor transferring problems, as described in the prior art section above. When the integrated system goes into the defrost mode it can use the aforementioned damper control system, but the associated problems can be eliminated because the exhaust fan can be electronically turned on or off independently, which is a feature not available in presently offered equipment.

The integration in the present invention allows for a standard primary crossflow core and an active secondary refrigerant exchanger core.

Since an aluminum and copper coil is used complete with a drain pan and drain pan sensor within the compression based heating and cooling portion of the integrated system, the associated leakage problems common in the prior art, can be avoided, and the general cost is reduced. The vapor is atomized upstream of the coil, and then as it hits the warmed coil it immediately evaporates because the air coil runs at a temperature well above the evaporation point. The humidification section of the system only operates when the heating and cooling section is operating in the heating mode.

Such an integrated system offers some or all of the following advantages over the prior art:

general efficiency increase a generally healthier indoor environment one system to install as compared to three or four less installed space needed one extra fan for the HRV as compared to three or four more control over the operating fans better mixing and supply of fresh and heated or cooled air to each room one control system as compared to three or four increased efficiency in the heating mode increased efficiency in the cooling mode increased efficiency in the HRV Mode better defrost without causing negative pressure or transferring odor to space better humidity control one main power connection complete with internal down fusing

BRIEF DESCRIPTION OF THE DRAWINGS

The invention will now be explained in greater detail, with reference to the accompanying drawings of the preferred embodiment by way of example, in which:

FIG. 2 includes four two-dimensional drawings of the best mode of the integrated system, complete with a push-through coil and a closed loop geothermal heat pump, FIG. 2-1 being a front view, FIG. 2-2 being a side view, FIG. 2-3 being a back view, and FIG. 2-4 being a side view;

DETAILED DESCRIPTION OF THE PREFERRED EMBODIMENT

Figure 1:
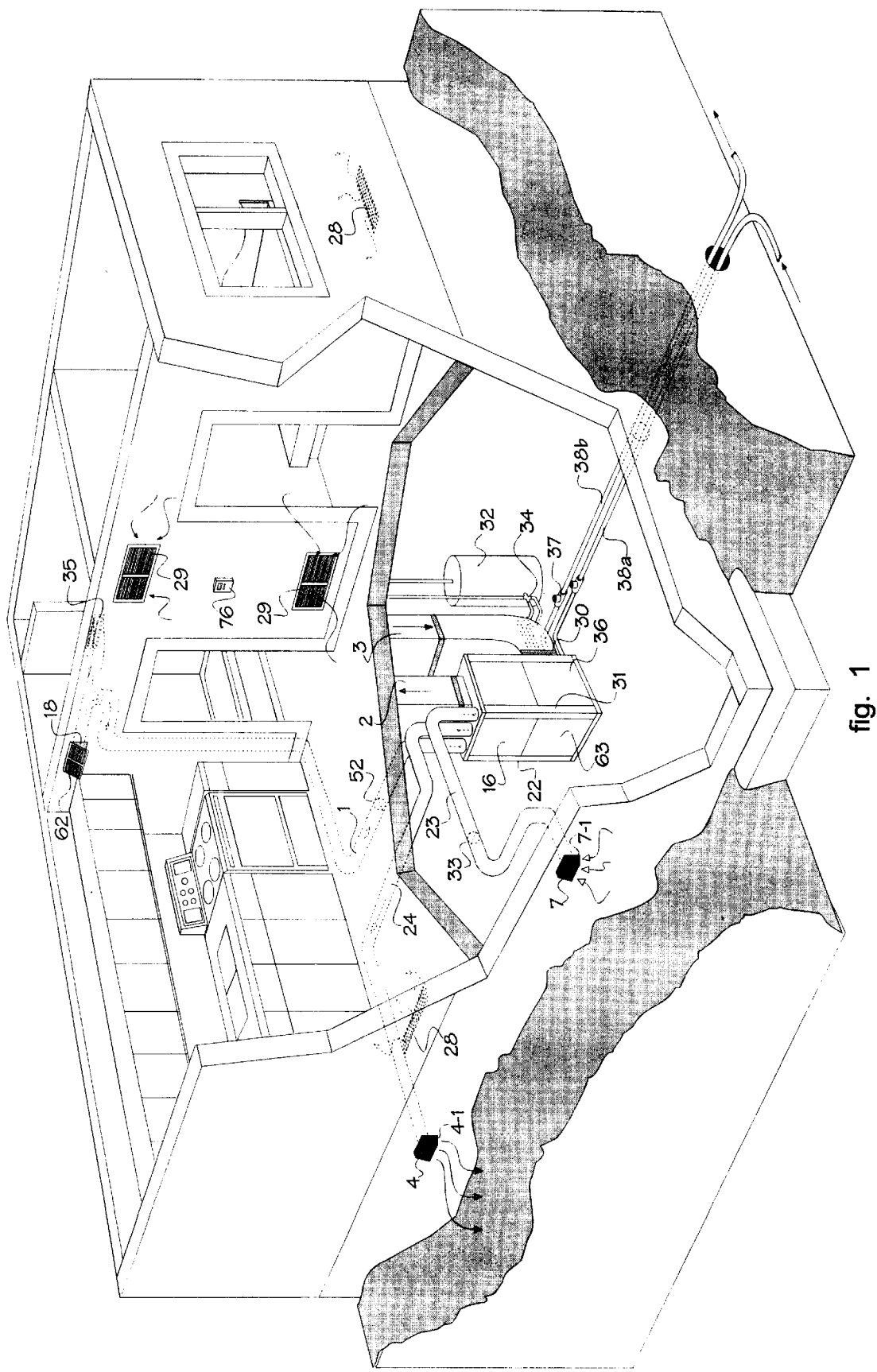
FIG. 1 is a three-dimensional cut-open perspective schematic view of a home fitted with the best mode of the invention.
Figure 5:
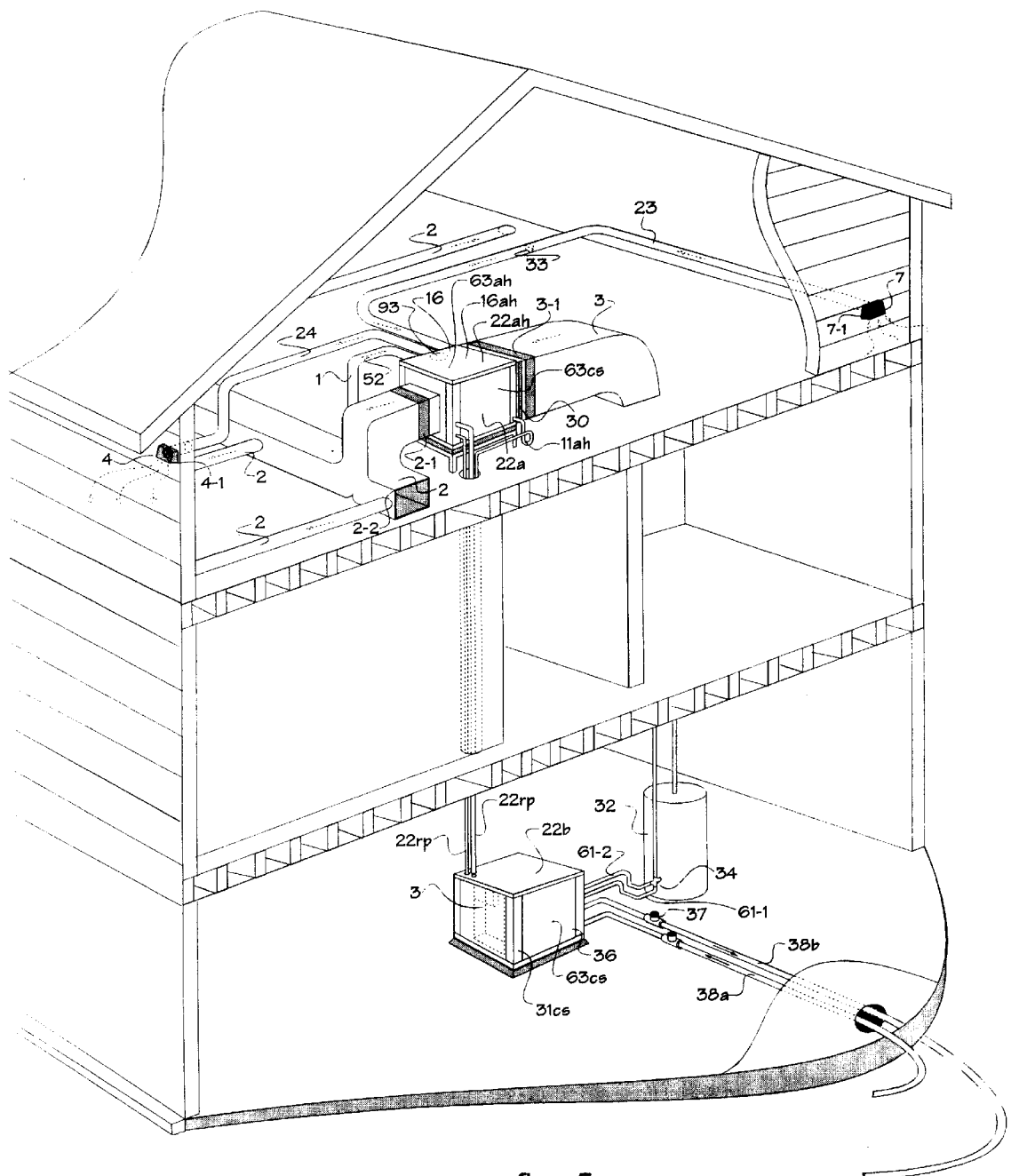
FIG. 5 is a cut-open schematic perspective view of a home fitted with a split configuration of the invention, with a complete split compressor section in the lower portion of the space and a remote air handler in the upper section of the space, with a push-through coil and a closed-loop geothermal heat pump.
Figure 8:
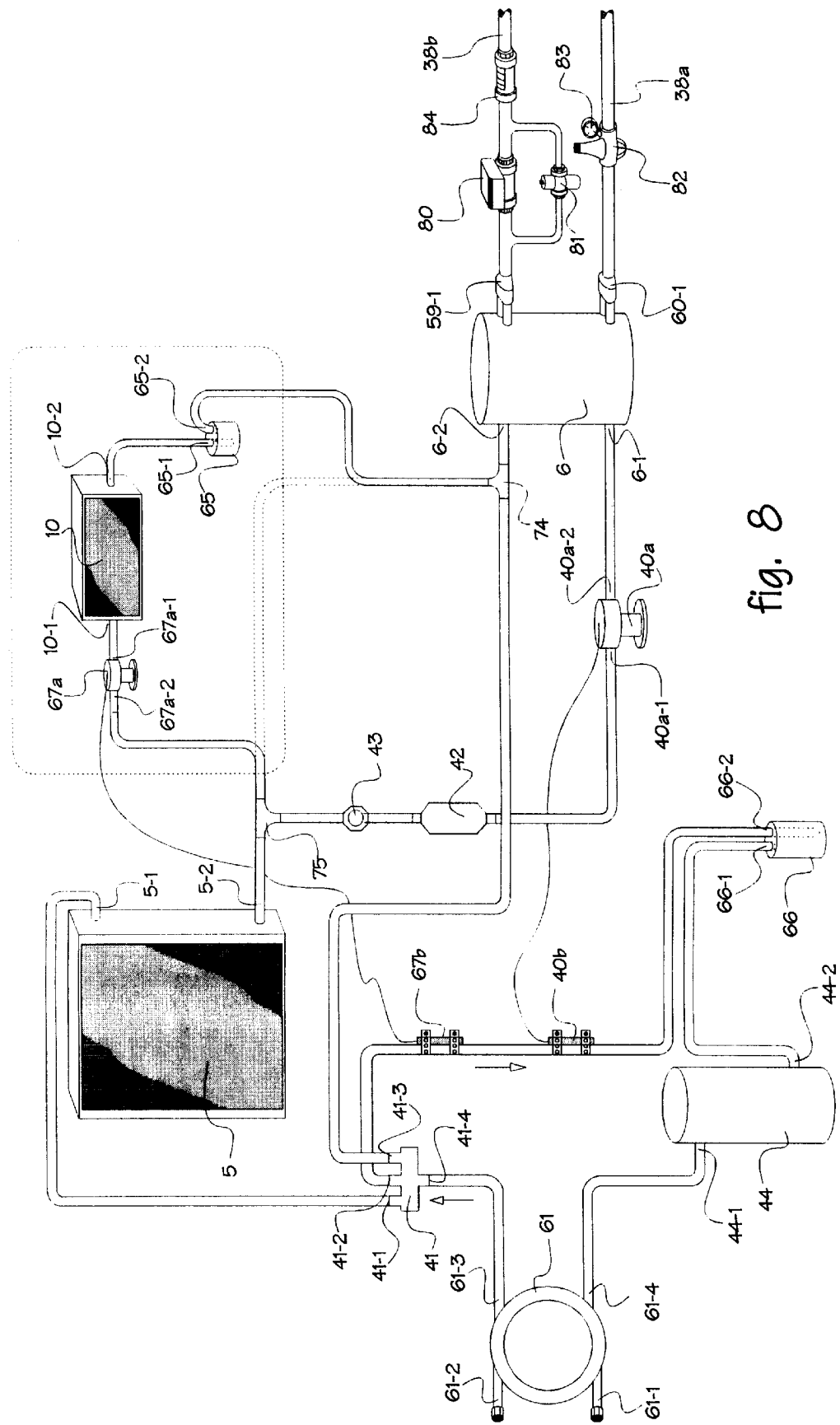
FIG. 8 is a piping schematic for the "compression based heating cooling system", in this case referring specifically to a geothermal open-well system, refrigeration piping and including the optional high efficiency reversible evaporator/condenser primary heat exchanger, plus a sub-section of FIG. 6.
Figure 9:
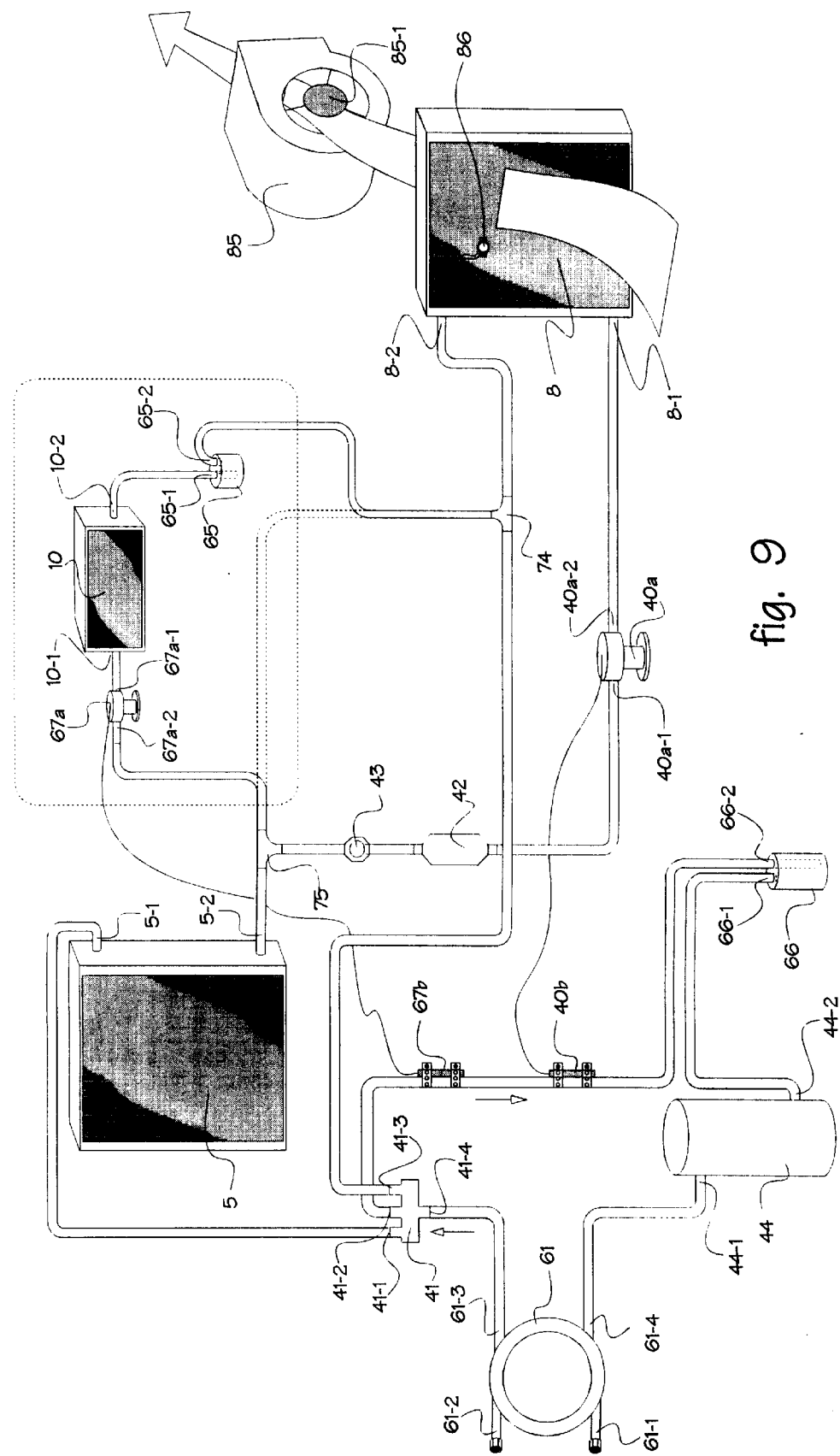
FIG. 9 is a piping schematic for the "compression based heating cooling system", in this case referring specifically to an "air-to-air" refrigeration piping and including the optional high efficiency reversible evaporator/condenser primary heat exchanger, plus a sub-section of FIG. 6.

The preferred embodiment of the invention is shown schematically in FIG. 1, and an alternative embodiment is shown in FIG. 5. There are three main configurations of the preferred embodiment, as shown in FIGS. 7, 8, and 9.

Figure 3:
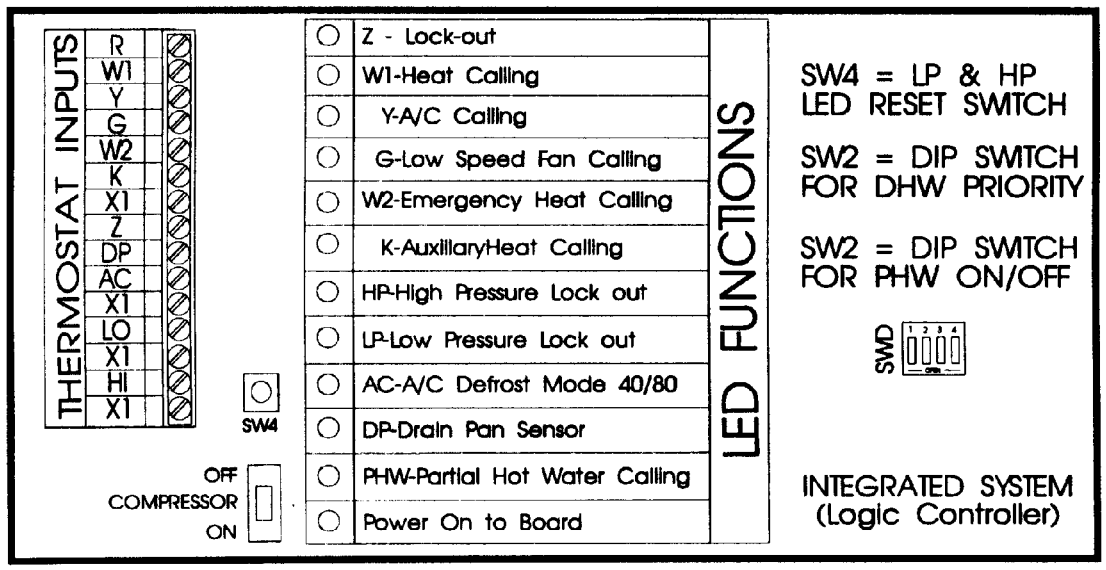
FIG. 3 shows the electronic boards that are used to control the integrated system.
Figure 3:
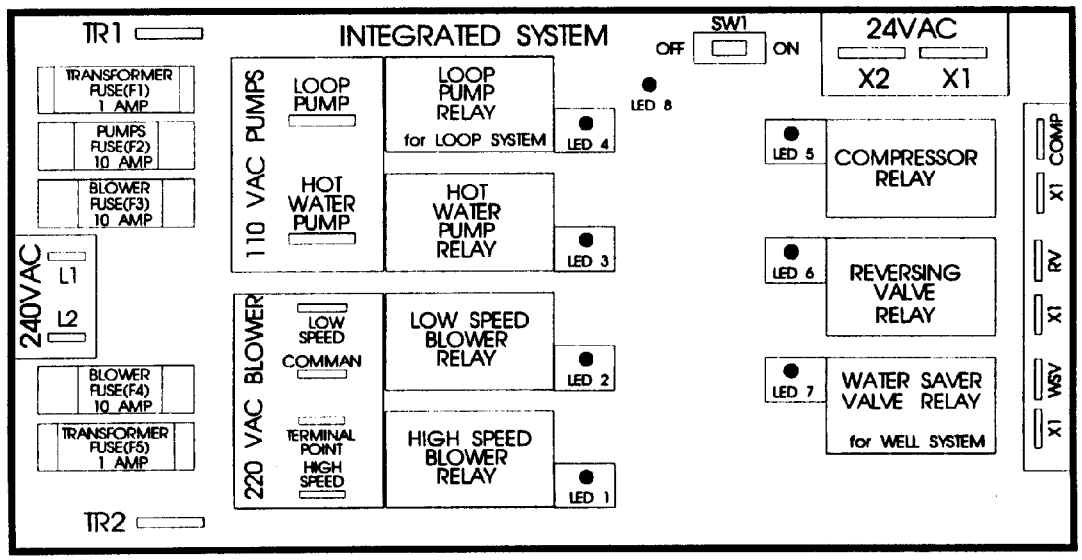
Figure 4:
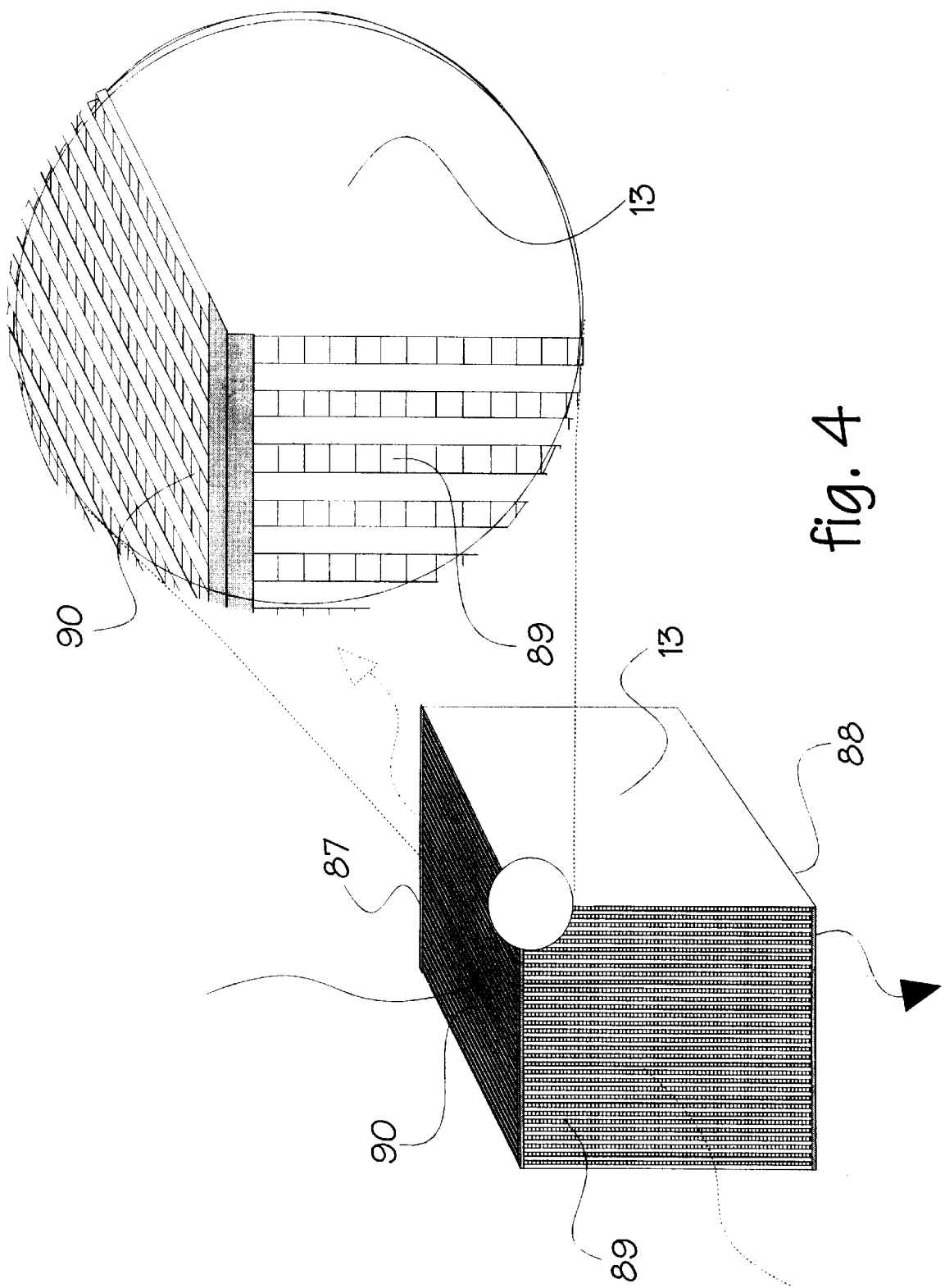
FIG. 4 is an exploded view of a primary passive cross flow air-to-air heat exchanger core (PCAAHEC), showing the two heat exchange channels.
Figure 7:
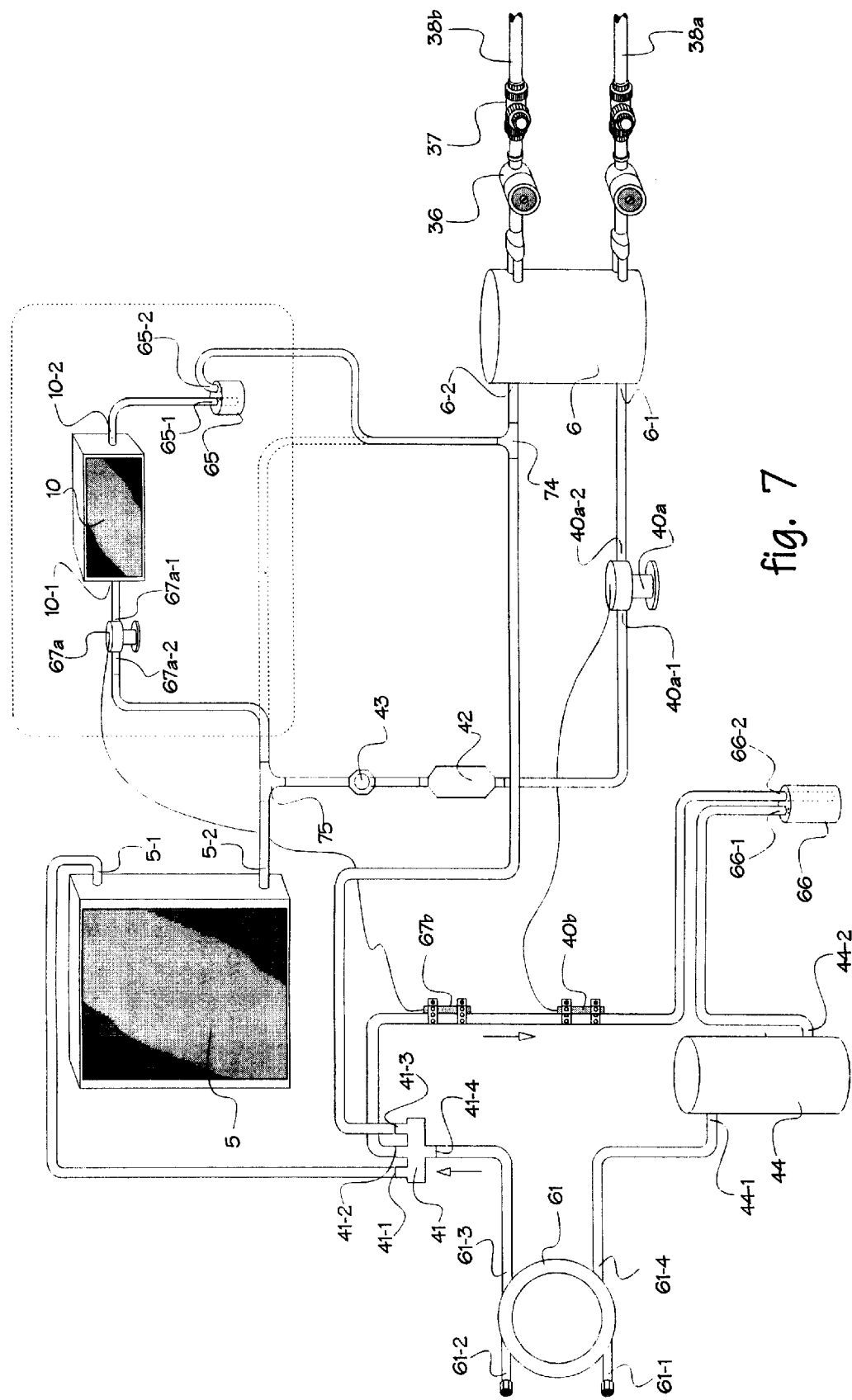
FIG. 7 is a piping schematic for a "compression based heating cooling system", in this case referring specifically to a geothermal closed loop system, refrigeration piping and including the optional high efficiency reversible evaporator/condenser primary heat exchanger, plus a sub-section of FIG. 6.

The best mode example, as illustrated in FIG. 7, is a geothermal heat pump complete with a closed underground energy absorption loop in the heating mode. In the cooling mode the direction of flow is reversed by the internal four-way valve 41, as activated by the electronic control system (FIG. 3). The four-way valve is in the normally closed position when the system is in the heating mode. The electronic control system (FIG. 3) causes the solenoid on the four-way valve 41 to shift, resulting in a reverse flow of refrigerant.

The integration of all the on-board systems within the integrated system offers higher efficiencies. However, the geothermal portion of the total system offers a co-efficient of performance (COP) of 3–3.5 to 1. One part of the energy is taken from the electrical components within the system, compressor 44 and blower fan motor 54, loop pumps 36, plus any other electrical components. The other 2 to 2.5 parts of the total energy is absorbed from the ground, using a water and/or anti-freeze solution at a suitable volume and flow rate. It should be noted that heat energy always travels to cold. In the case of an open-well geothermal heat pump, as illustrated in FIG. 8, no anti-freeze would be used. A geothermal open-well system will offer approximately 10% higher efficiencies than a closed loop geothermal heat pump, although water quality problems can create maintenance issues. As the energy is absorbed from the ground, a Freon-to-water based, reversible water coil 6 (evaporator in heating mode—condenser in cooling mode) will transfer the energy as heat to the reversible indoor air coil 5 (condenser in heating mode—evaporator in cooling mode) within the occupied space. The flow rate will cause a delta t or difference in temperature at the water inlet pipes 38a and 38b. In the heating mode, the temperature will drop from incoming 38a to outgoing 38b. This drop in temperature is calculated as the rate of absorption and all internal and external components are designed to match the compressor 44 and other component sizing. The internally sealed Freon system 22 transfers the energy from the outside water closed loop or an open well to the inside air coil 5, to be used for heating. The reverse is true in the cooling mode, meaning that the closed water loop is used to reject heat, therefore transferring the colder temperature to the indoor air coil 5. In the cooling mode, the electronic controls will cause the four-way valve 41 to reverse the Freon flow to the opposite direction by sending 24-volt power to the 24-volt solenoid which is attached to the four-way valve 41. The solenoid pulls in, causing the pilot port on the valve to redirect the high pressure from the high pressure line to the low pressure side of the valve, causing it to slide and change the Freon flow to the opposite direction. The differential pressures hold the valve in position during the cooling mode operation. The on-board electronic package also controls appropriate time delays and control sequences.

Figure 6:
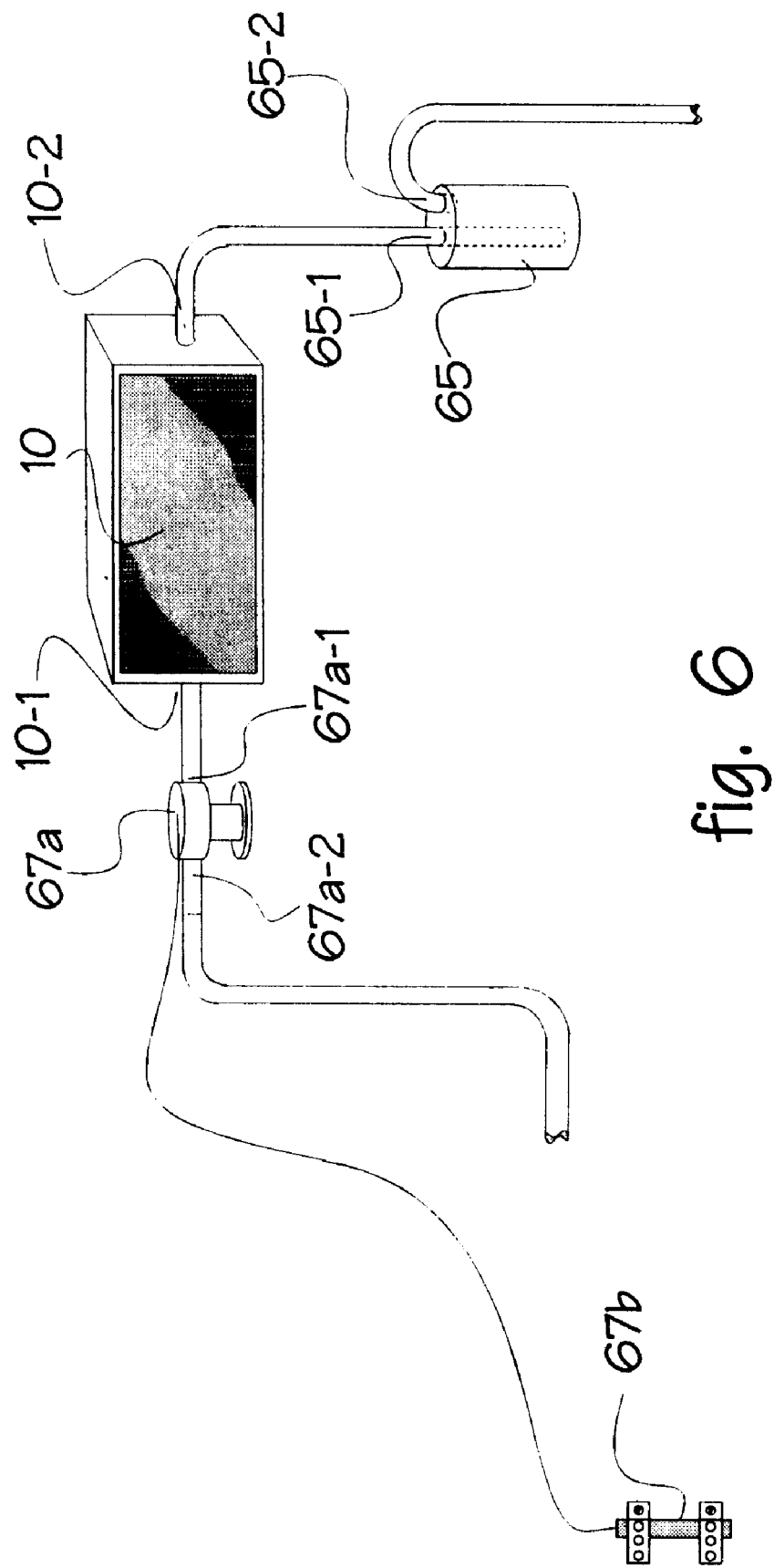
FIG. 6 is a three-dimensional schematic of the optional high efficiency secondary active reversible evaporator/condenser heat exchanger.

When the indoor centrally located or zoned thermostat 76 calls for heating, the indoor closed loop Freon (R22) refrigeration system starts in the heating mode. The four-way valve 41 will be in the off or normally closed position. In the heating mode the indoor air coil 5 will act as a condenser and the water coil 6 will be in the evaporative mode. If the optional high efficiency evaporator/condenser heat exchanger, as shown in FIG. 6, is installed, it will be in the same mode as the water coil. In the heating mode the optional high efficiency evaporator/condenser heat exchanger air coil 10 acts as an evaporator and it acts as a condenser in the cooling mode, the same as the water coil 6.

The on-board electronics as shown in FIG. 3 will cause the following sequence of events at heating mode start up. The HRV section would already be running continuously, therefore the main indoor blower 12 will already be running on low speed operation. The thermostat 76 will call for heat, sending a 24-volt supply to the system. Since the system is completely integrated, the electronics will immediately set up for operational sequencing. As the thermostat 76 calls, the system will immediately turn on the loop pumps 36 on a closed loop system (FIG. 7), or open the 24-volt motorized zone valve 80 (FIG. 8) for a well system or start the outdoor blower fan 85, on an air-to-air system (FIG. 9). The on-board electronics control all functions within the integrated system and include a series of LEDs for on-board diagnostics. All inputs and all outputs are monitored.

The system differs from prior art systems in that the loop pumps are installed internally and are electronically controlled and pre-fused within the integrated system.

If the optional desuperheater 61 is installed, the desuperheater pump 71 will also turn on immediately upon the heating call from the thermostat 76 and pull a quantity of water directly from the brass cross 34 attached to the domestic hot water tank 32. As the water flows into the hot water connection 61-1, it flows past the desuperheater high limit sensor 77, which is attached to the incoming desuperheater water line 78. The sensor 77 measures the temperature and if the temperature is below 130 degrees F. the desuperheater pump 71 will continue to operate. However, if the temperature is above 130 degrees F., the desuperheater pump 71 will shut off.

Then there will be a 16- to 24-second time delay and the compressor 44 will start. The indoor blower 12 will already be on at low speed because the HRV section will be on continuous operation. The indoor blower fan 12 will jump to high speed operation after the compressor 44 has been on for 8 seconds. This quick response system is built into the on-board electronics, FIG. 3. It allows the compressor to warm up before the blower 12 starts to transfer energy to the indoor space, reducing the opportunity for cool air to be transferred to the indoor space. This feature helps to encourage creature comfort.

In the cooling mode the blower 12 will jump to high speed immediately. When the indoor blower 12 jumps to high speed it will draw more air through the weighted modulating air damper device 27. The device 27 will allow the air flow through the PCAAHEC 13 to increase by approximately 10%, increasing the positive pressure within the space by approximately 10%. As well as modulating air flow through the PCAAHEC 13, one of the functions of the modulating device 27 is to adjust this amount.

The compressor 44 will start, causing the Freon to be compressed and flow throughout the refrigeration closed loop system. As the Freon is compressed it will heat up.

As soon as the compressor 44 starts, the Freon will flow from the compressor 44 to the 44-1 as a hot high pressure gas. It will then travel to the desuperheater 61 at the entry point 61-4. If the desuperheater 61 is calling to offer heat to the domestic hot water tank 32, cool water will run through the desuperheater 61 from the water entry point 61-1, taking approximately 6,000 and 10,000 BTU's (depending on the system size) from the condensing hot gas by way of heat exchange and then send the heated water back to the domestic hot water tank 32 through the exiting point 61-2 on the water side of the desuperheater 61. After he Freon has been slightly cooled by desuperheater 61, it then travels to the Freon exiting point 61-3 and flows towards and then enters the four-way valve 41 at the entry point 41-4 as a hot gas.

Although the desuperheater 61 will take some of the energy off in the heating mode, it actually increases the efficiency of the system 22 by increasing the sub cooling. In the cooling mode the desuperheater 61 will offer free hot water to the occupants because it will simply reduce the need to reject the heat energy out to the ground, taking advantage of the process.

The hot gas then travels through the four-way valve 41 and exits at the exiting point 41-1 and travels towards the indoor air coil 5. It enters the indoor air coil at the entry point 5-1. As the hot gas enters the indoor air coil 5, a heat exchange occurs because the indoor distribution blower 12 will have been turned on. The air that is traveling across the indoor coil will be approximately 70 to 73 degrees F., depending on the fresh air coming into the mixing chamber 14 for the PCAAHEC 13. The temperature of the Freon traveling through the Freon side of the indoor air coil 5 will be approximately 150 degrees F., so a heat exchange will occur. The heat from the Freon will transfer to the air, to supply the space with heated air, and the Freon temperature will drop. As the Freon temperature drops it will condense and change the state of the Freon from a hot high pressure gas to a warm saturated high pressure liquid. It will exit the indoor air coil 5 at the exiting point 5-2.

The Freon will then travel to the air coil side T 75 and run in two directions, if the secondary high efficiency active reversible evaporator/condenser heat exchanger 10 is installed, as illustrated in FIG. 6. For this section of the description, it is assumed that the secondary active reversible evaporator/condenser heat exchanger 10 is not installed. The secondary refrigerant flow will be covered at the end of this section.

In this case, the warm saturated high pressure Freon will travel to the sight glass and moisture indicator 43, then through the reversible filter/drier 42 where any contaminants or moisture will be removed. The Freon will then travel to the bi-flow TX valve 40*a* entry point 40*a*-1. As the warm saturated high pressure liquid enters the bi-flow TX valve 40*a*, it will be atomized, essentially releasing the saturated energy, causing the Freon to drop down to an extremely cold temperature. As the Freon travels through the bi-flow TX valve 40*a* and is atomized based on a reduction in orifice size as dictated by the bi-flow TX valve 40*a* temperature sensing bulb 40*b* that is attached to the suction gas line, it will change state from a warm saturated high pressure liquid to an un-stable super cooled vapor, hereinafter referred to as flash gas. The flash gas will exit the bi-flow TX valve 40*a* the exiting point 40*a*-2 and the pipe will double or triple volumetrically. Then it will travel to and enter the entry point 6-1 at the water coil 6. As the flash gas enters the water coil 6, it will be super-cooled and will look for heat to be transferred. The water or anti-freeze solution will be traveling counter flow through the heat exchanger simultaneously at a higher temperature. The Freon will absorb heat from the water or anti-freeze solution, thereby cooling the water and increasing the temperature of the Freon.

In an air-to-air system as illustrated in FIG. 7 the outdoor air coil 7 absorbs the energy from the outside air and transfers it to the Freon. As suggested herein, an air-to-air configuration would not be the most efficient manner of absorption or rejection. However there are applications where an air-to-air system is appropriate.

As the temperature of the Freon increases, it will once again change state from a flash gas to a vapor, hereinafter referred to as suction gas. The suction gas will exit the water coil at exit point 6-2 then travel toward the four-way valve 41. The suction gas will return to the entry point 41-3 and then come out of the four-way valve 41 exiting point 41-2 and then travel towards the accumulator 66 which is an optional piece of equipment, depending on the compressor 44 specifications. (Not all compressors require accumulators.) If an accumulator is installed, the suction gas will enter the accumulator 66 at entry point 66-2. Since liquid cannot be compressed and will damage a compressor 44, any liquid that may still be in the suction gas will drop out at the accumulator 66, allowing only suction gas to return to the compressor 44. The suction gas will then travel out of the accumulator 66 exiting point 66-1 and travel back to the suction entry point 44-2 at the compressor 44 where the suction gas is then re-compressed by the compressor 44 for another run through the system. This is the complete refrigeration process, which is a constant flow type system.

In the air conditioning mode all refrigeration flows are reversed. When the thermostat 76 calls for air conditioning, the four-way valve 41 is activated by on-board electronic control system (FIG. 3), and it shifts from a normally closed position to the opposite position. The indoor air coil 5 will then be acting as an evaporator and the water coil 6 will be acting as a condenser. The indoor mixed return and fresh air will push through the indoor air coil 5 and since it is a condenser, it will absorb the heat from the indoor air. Simultaneously, the geothermal fluid will absorb heat from the water coil 6 because it will be acting as a condenser. In the case of an air-to-air system, the outdoor coil will be acting as a condenser. When the outdoor air temperature flows across the outdoor coil 86, as best shown in FIG. 9, at a cooler temperature, it will absorb the heat from the outdoor coil, for rejection to the outdoor air. When the optional secondary, high efficiency, active reversible evaporator/condenser heat exchanger, as shown in FIG. 6, the secondary heat recovery air coil would act as a condenser when the compression based heating and cooling system 22 is on in the cooling mode. The exhaust air travels through the secondary coil 10 at a lower temperature and absorbs heat from the Freon that is flowing through the secondary coil 10 and helps to increase the efficiency by offering extra heat rejection.

If the optional secondary coil 10 is installed, it would work within the active refrigeration system in the heating mode, in the following manner.

In the case where, compression based 22 system is on in the heating mode and the active 10 is installed, the second direction that the high pressure liquid Freon would flow from the piping T 75 to the sight glass 43 as described earlier in this section and the second direction would be to the TX valve 67*a*, entry point 67*a*-2, as shown in FIG. 6. As the warm saturated high pressure liquid enters the bi-flow TX valve 67*a*, it will be atomized, essentially releasing the saturated energy causing the Freon to drop down to an extremely cold temperature. As the Freon travels through the bi-flow TX valve 67*a* and is atomized based on a reduction in orifice size as dictated by the bi-flow TX valve 67*a* temperature sensing bulb 67*b* that is attached to the suction gas line, it will change state from a warm saturated high pressure liquid to an un-stable super cooled vapor, hereinafter referred to as flash gas. The flash gas will exit the bi-flow TX valve 67*a* the exiting point 67*a*-1 and the pipe will double or triple volumetrically, then it will travel to and enter the entry point 10-1 at the secondary air coil 10. As the flash gas enters the secondary air coil 10, it will be super cooled and will look for heat to be transferred into it. After transfer has occurred in the PCAAHEC 13 core the exhaust air is simultaneously traveling out of the PCAAHEC 13 simultaneously and through the secondary air coil 10, typically at a higher temperature. The Freon will absorb extra heat from exhaust air, thereby further cooling the exhaust air at the outgoing exhaust air channel 90 and increasing the Freon temperature.

As the temperature of the Freon increases it will once again change state from a flash gas to a vapor, hereinafter referred to as suction gas. The suction gas will exit the secondary air coil 10 at exit point 10-2, then travel toward into the bi-flow accumulator 65 at entry point 65-1.The Freon will drop any liquid in the accumulator allowing only suction gas to exit at the exiting point 65-2. The suction gas will travel to the water coil side T 74 and flow into the suction gas that will be flowing simultaneously from exit point 60-2 from the water 6. The suction gas will exit the water side coil T 74 and travel toward the four-way valve 41 along with the suction gas that exits the compression based 22, water coil 6. The suction gas will flow to the four-way valve 41, entry point 41-3 and then come out of the four-way valve 41 exiting point 41-2 and then travel towards the accumulator 66 which is an optional piece of equipment, depending on the compressor 44 specifications, if installed at the accumulator 66 entry point 66-2. Since liquid cannot be compressed and will damage a compressor 44, any liquid that may still be in the suction gas will drop out at the accumulator 66, allowing only suction gas to return to the compressor 44. The suction gas will then travel out of the accumulator 66 exiting point 66-1 and travel back to the suction entry point 44-2 at the compressor 44 where the suction gas is then re-compressed by the compressor 44 for another run through the system. This is the complete refrigeration process which, is a constant flow type system.

The Geothermal Section:

A geothermal heat pump is known to be the most efficient method of heating and cooling today. Since there are no fossil fuels being burned to generate space heat, there is no flame or chimney in the living space. The environmental benefits are obvious. The geothermal heat pump uses renewable energy in that the system uses energy, which is constantly available under ground. Electricity has a 1 to 1 co-efficient of performance (COP). When you turn on an electric resistance heater you will get heat out, in exactly the same rate as you put energy in 1 to 1. However, a geothermal heat pump offers between 3 and 4 to 1 COP. If it costs one dollar to turn on the compressor you will get that one dollar worth of energy plus, you will get another 2 to 3 dollars worth of energy from the ground. Therefore you will end up with a COP of 3 or 4 to 1. In other words you will have received three or four units of usable energy for the cost of one unit of energy. The incorporation of an optional desuperheater to heat domestic hot water will also help to increase the efficiency. The common savings with a desuperheater will be approximately 60 to 70% over that of a standard electric hot water heater. It would be coupled directly with a standard hot water tank. The technology has proven itself over and over again with thousands of installations as proof. Geothermal is a "compression based technology", so the integration of a humidifier and a heat recovery ventilation system further helps to decrease the capital cost and increase the operating efficiency of the heating and cooling system. The integrated system offers unparalleled efficiency and efficacy.

The HRV Section:

An HRV is very common in extreme temperature and humid climates. HRV's are used to ventilate at a specific rate with very low energy loses. As, energy costs are rising, building technologies have followed pace and become tighter and tighter. The tighter the building the more the need to ventilate for the benefit of the building structure and the health of the occupants. The HRV section would normally be running on a continuous basis. However, the HRV can be turned on and off if required, based on a unit-mounted humidistat 45 that is located within the indoor return and fresh air mixing chamber 14. In most cases the humidistat 45 would not be used and the HRV will operate on a continuous basis. For this example, it is assumed that the HRV is on continuous operation.

Figure 10:
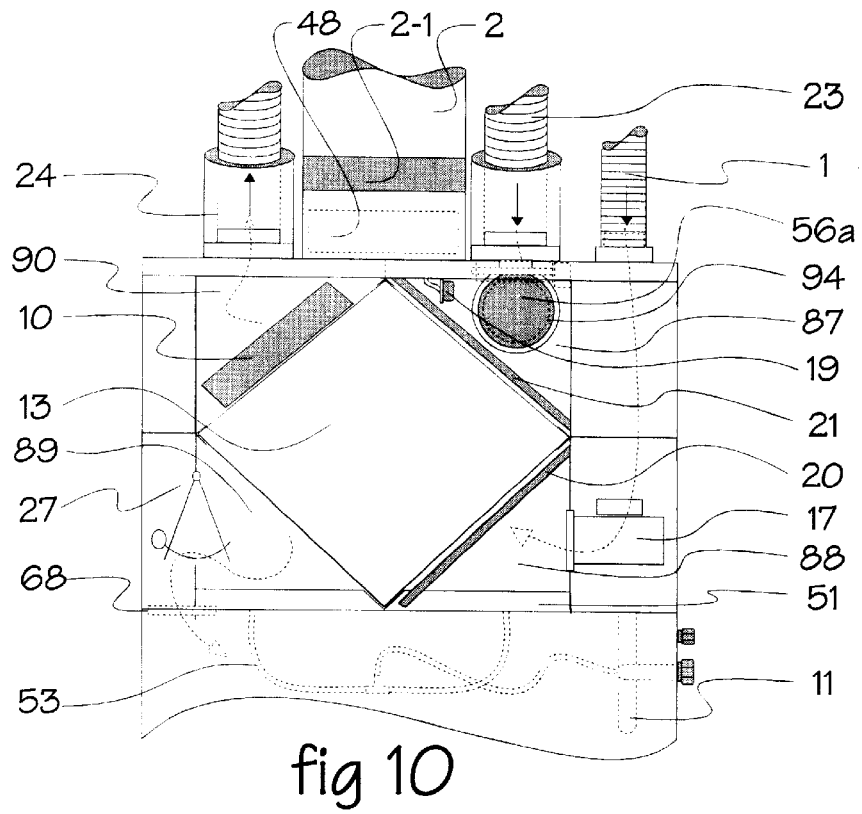
FIG. 10 is an exploded view of the heat exchange chamber, including both primary and secondary heat exchangers, plus the 70 degrees F. warm or 100 degrees F. pre-heated air quick defrost damper—best mode.
Figure 11:
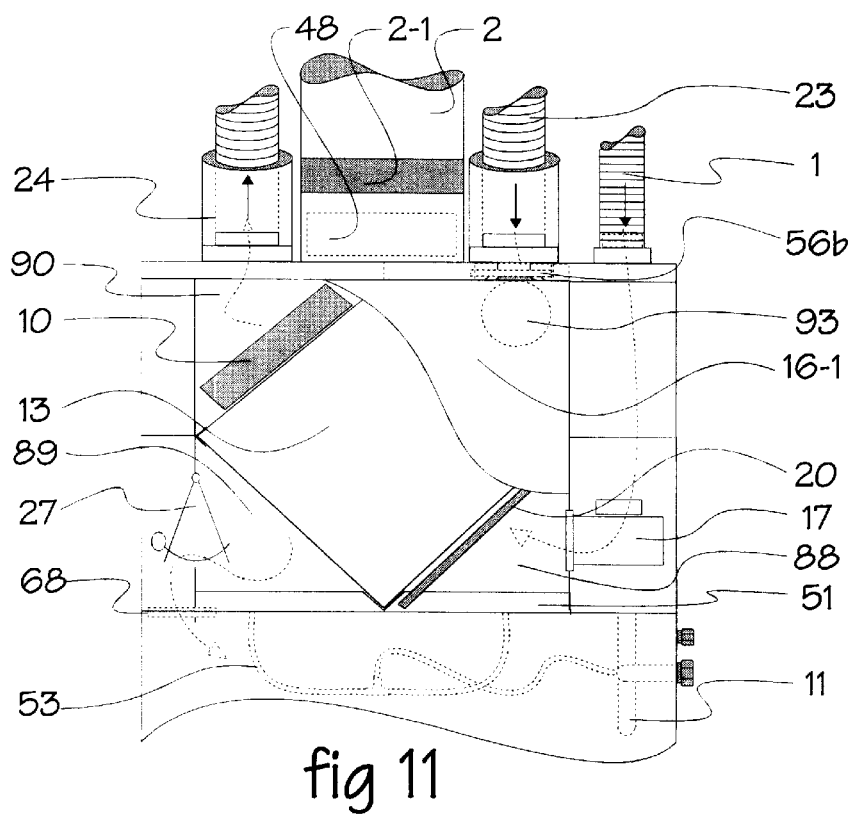
FIG. 11 is an exploded view of the heat exchange chamber, including both primary and secondary heat exchangers, plus the 70 degree F. space air defrost damper—special applications mode.

Regarding the HRV defrost methods, although there are many methods (configurations) of PCAAHEC 13 defrost that are available, the three most common will be described herein. Since the integrated system offers independent control of the dedicated stale air exhaust fan 17, all three defrost methods, as described herein, eliminate the opportunity for the defrost mode to cause a negative pressure within the building as described in the prior art section above. The preferred, best mode, 70 degrees F. warm or 100 degrees F. pre-heated air defrost method, as shown in FIG. 10 and the 70 degrees F. space air defrost method, as shown in FIG. 11, also eliminate the opportunity for odor transfers from the stale air areas to the fresh supply air, also as described in the prior art section above. The first 70 degrees F. warm or 100 degrees F. pre-heated air defrost method would also offer a fast acting defrost capability which is not available in prior art. All defrost methods will only be used when the compression based heating and cooling system 22 is in the heating mode. Frosting/icing of the PCAAHEC 13 would only be possible in the winter operation in cold that have an average winter temperatures below 23 degrees F. Frosting/icing would only occur on the fresh air side of the PCAAHEC 13, as cold, humid fresh incoming air crosses the warmer exhaust. At approximately 23 degrees F., and when the humidity level is above 60% relative humidity (RH), the difference in temperature and humidity between the incoming fresh air and the 70, 50% RH indoor stale air, being exhausted. The humidity from the incoming fresh air, will condense on the surface at the entrance of the fresh side of the PCAAHEC 13, causing first frosting then after a period of time icing. Excessive frosting/icing will block the PCAAHEC 13, reducing and eventually blocking airflow from the 87, 89 and 68, thereby reducing or eliminating heat recovery ventilation.

The first defrost method that is available within the integrated system is the 70 degrees F. warm or 100 degrees F. pre-heated air defrost method (configuration), as shown in FIG. 10 which would include the use of a defrost damper 56a, as shown in FIG. 10. With this method, the defrost damper 56a, normally closed vertical position would be blocking the optional positive pressure defrost port 94 which is located directly behind the defrost damper 56a. The positive pressure defrost port 94, between the back vertical wall in the HRV exchange chamber 16 and it is directly lined up with a port located in the indoor air coil positive pressure chamber 70, as shown in FIG. 10, offering warm 70 degree F. or 100 degree F. air flow from indoor positive pressure chamber 70, to the fresh air incoming channel 87, when the system is in the defrost mode. When the outdoor temperature drops to 23 degrees F. as sensed by the defrost sensor 19 which is located in the incoming fresh air channel 87, the sensor 19 will activate a 15-minute defrost time out period, as dictated by the on-board electronic system, as shown in FIG. 3. During the defrost time out period, the HRV will operate as usual. During the defrost time out period, the PCAAHEC 13 can experience some slight surface ice lensing (light surface coating). After the time out period, the dedicated stale air exhaust fan 17 will shut off and the defrost damper 56a will shift from the normally vertical position to the horizontal position shutting off the incoming fresh air from entering the incoming fresh air channel 87. If the compression based system 22 is not operating in the heating mode, the shift in the damper 56a will cause the indoor 70 degree F. space air, from the indoor air coil positive pressure chamber 70 to be drawn through the defrost bypass port 94 to the incoming fresh air channel 87. If the compression based system 22 is operating in the heating mode the shift in the damper 56a will cause the pre-heated 100 degree F., from the indoor air coil positive pressure chamber 70 to be drawn through the defrost bypass port 94 to the incoming fresh air channel 87. The 70 or 100 degree F. warm space air will then enter the fresh air heat recovery core particulate filter 21 and then travel through the fresh air side of the PCAAHEC 13 and will defrost the PCAAHEC 13. The air will then travel through the PCAAHEC 13 and then into the incoming fresh air channel 89, after which, it will then travel past the adjustable, weighted, modulating pressure differential air balancing device 27 and into the fresh air induction port 68 and into the indoor return and fresh air mixing chamber 14 past all the components therein to be sent back to the indoor coil positive pressure chamber 70. The air will then re-circuit back through the same process for the prescribed time period. Since the 70 or 100 degree F. warm air will hit the surface of the PCAAHEC 13 it turn to liquid and drain off the PCAAHEC 13 and run into the HRV drain pan 51 and then drain to the condensate tubing 53 for discharge to the condensate discharge point 58 and sent to the drain. If the compression based system 22 is not operating, then the defrost mode will operate for approximately 3 minutes. If the compression based heating cooling system 22 is operating the defrost mode will operate for 1 to 1.5 minutes, as dictated by the on-board electronic system, as shown in FIG. 3. After the appropriate defrost operation period is completed (1.5 or 3 minutes) the PCAA-HEC 13 should be completely ice free and the defrost damper 56a will shift from the horizontal position back to its normal vertical position and the dedicated stale air fan 17 will turn back on, thereby allowing fresh outdoor air to travel into the incoming fresh air channel 87 and back through the fresh air core filter 19, through the PCAAHEC 13 and into the air while the dedicated air fan 17 will cause the stale air to travel through the HRV system as normal operating condition dictates. If the temperature stays below 23 degrees F. then the defrost process will continue to cycle on after a 15-minute period. The defrost mode will continue to cycle off and on until the temperatures rises above the prescribed 23 degrees F. With this method there is no possibility of transferring odors or causing a negative pressure in the space, therefore this method would be considered as the standard configuration this method is preferred.

The second 70 degrees F. space air method of defrost (configuration) that is available within the integrated system is the, 70 degrees F. space return indoor air import defrost method which would include the use of a defrost damper 56b, as shown in FIG. 11. With this method, the defrost damper 56b, normally closed vertical position would be blocking the optional 70 degrees F. space indoor air import defrost port 93, as located on the HRV exchange chamber door 16-1, covering the HRV chamber 16. The defrost damper 56b would be in a position to allow the air to flow from the 70 degrees F. inside space air to flow into the fresh air channel while the dedicated stale air fan is off.

When the outdoor temperature drops to 23 degrees F. as sensed by the defrost sensor 19 which is located in the incoming fresh air channel 87. The sensor 19 will activate a 15-minute defrost time out period, as dictated by the on-board electronic system, as shown in FIG. 3. During the defrost time out period, the HRV will operate as usual. During the defrost time out period, the PCAAHEC 13 can experience some slight surface ice lensing (light surface coating). After the time out period, the dedicated stale air exhaust fan 17 will shut off and the defrost damper 56b will shift from the normally vertical position to the horizontal position shutting off the incoming fresh air from entering the incoming fresh air channel 87 and causing the indoor 70 degree F. space air, surrounding the system to be to be drawn through the optional 70 degree F. space air import defrost bypass port 93 to the incoming fresh air channel 87. The warm space air will then enter the fresh air heat recovery core particulate filter 21 and then travel through the fresh air side of the PCAAHEC 13 and will defrost the PCAAHEC 13. The air will then travel through the PCAAHEC 13 and then into the incoming fresh air channel after the incoming fresh air channel after the PCAAHEC 89, after which it will then it will travel past the adjustable, weighted modulating pressure differential air balancing device 27 and into the fresh air induction port 68 and into the indoor return and fresh air mixing chamber 14 and past all the components therein to be sent to the indoor coil positive pressure chamber 70. The air will then re-circuit back through the same process for the prescribed time period. Since the warm air will hit the surface of the PCAAHEC 13 it will turn to liquid and drain off the PCAAHEC 13 and run into the HRV drain pan 51 and then drain to the condensate tubing 53 for discharge to the condensate discharge point 58 and sent to the drain. The defrost mode will operate for approximately 3 minutes, no matter whether the compression based heating cooling system 22 is operating or not. After the 3 minutes defrost operation period is completed the PCAAHEC 13 should be completely ice free and the defrost damper 56 a will shift from the horizontal position back to its normal vertical position and the dedicated stale air fan 17 will turn back on, thereby allowing fresh outdoor air to travel into the incoming fresh air channel 87 and back through the fresh air core filter 19, through the PCAAHEC 13 and into the air while the dedicated air fan 17 will cause the stale air to travel through the HRV system as normal operating condition dictates. If the temperature stays below 23 degrees F. then the defrost process will continue to cycle on after a 15-minute period. The defrost mode will continue to cycle off and on until the temperatures rises above the prescribed 23 degrees F. With this method there is the possibility of transferring odors, therefore in a standard configuration this method is not preferred, however, in certain applications, this method would prove useful.

Figure 12:
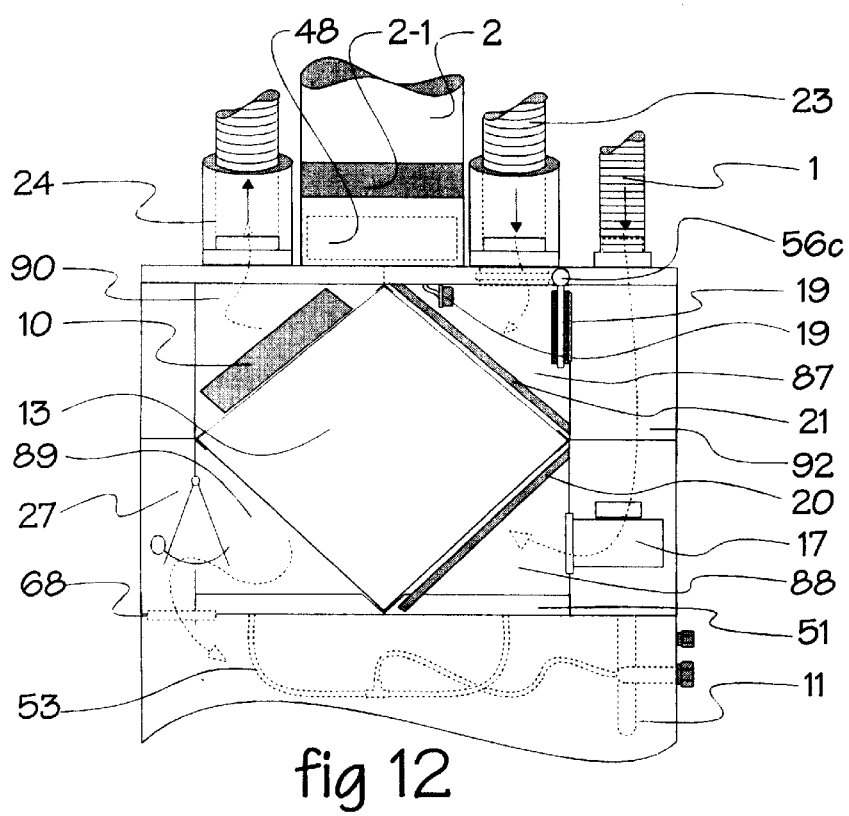
FIG. 12 is an exploded view of the heat exchange chamber, including both primary and secondary heat exchangers, plus the exhaust air quick defrost damper—special application mode.

The third special application method of defrost that is available within the integrated system is the exhaust air bypass defrost method which would include the use of the defrost damper 56c configuration, as shown in FIG. 12. With this defrost configuration, when the HRV system is operating normally, the defrost damper 56c would be blocking the defrost bypass port 92. When the outdoor temperature drops to 23 degrees F. as sensed by the defrost sensor 19 which is located in the incoming fresh air channel 87.

The sensor 19 will activate a 15-minute defrost time out period, as dictated by the on-board electronic system, as shown in FIG. 3. During the defrost time out period, the HRV will operate as usual. During the defrost time out period, the PCAAHEC 13 can experience some slight surface ice lensing (light surface coating). After the time out period has finished, the dedicated stale air exhaust fan 17 will shut off and the defrost damper 56c will shift from the normally vertical position to the horizontal position shutting off the incoming fresh air from entering the incoming fresh air channel 87 and causing the normally exhausted air at 70 degrees F. to be drawn through the optional defrost bypass port 92 to the incoming fresh air channel 87. The warm air will then enter the fresh air heat recovery core particulate filter 21 and then travel through the fresh air side of the 13 and will defrost the PCAAHEC 13. The air will then travel through the core 13 and then into the incoming fresh air channel after the core 89, then it will travel past the adjustable, weighted modulating pressure differential air balancing device 27 and into the fresh air induction port 68 and into the indoor return and fresh air mixing chamber 14 and past all the components therein to be sent to the indoor coil positive pressure chamber 70. The air will then re-circuit back through the same process for the prescribed time period. Since the warm air will hit the surface of the PCAAHEC 13 it will turn to liquid and drain off the PCAAHEC 13 and run into the HRV drain pan 51 and then drain to the condensate tubing 53 for discharge to the condensate discharge point 58 and sent to the drain. The defrost mode will operate for approximately 3 minutes, no matter whether the compression based heating cooling system 22 is operating or not. After the 3 minutes defrost operation period is completed the PCAAHEC 13 should be completely ice free and the defrost damper 56 a will shift from the horizontal position back to its normal vertical position and the dedicated stale air fan 17 will turn back on, thereby allowing fresh outdoor air to travel into the incoming fresh air channel 87 and back through the fresh air core filter 19, through the PCAAHEC 13 and into the air while the dedicated air fan 17 will cause the stale air to travel through the HRV system as normal operating condition dictates. If the temperature stays below 23 degrees F. then the defrost process will continue to cycle on after a 15 minute period. The defrost mode will continue to cycle off and on until the temperatures rises above the prescribed 23 degrees F. With this method there is the possibility of transferring odors, therefore in a standard configuration this method is not preferred, however, in certain applications, this method would prove useful.

Figure 13:
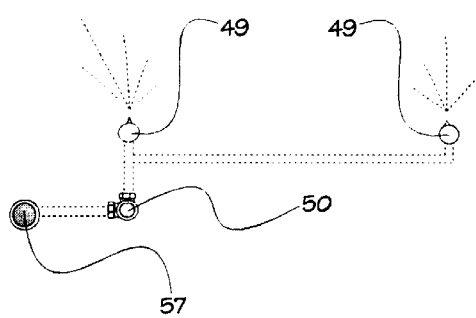
FIG. 13 is an exploded view of the on-board optional humidification system.
Figure 14:
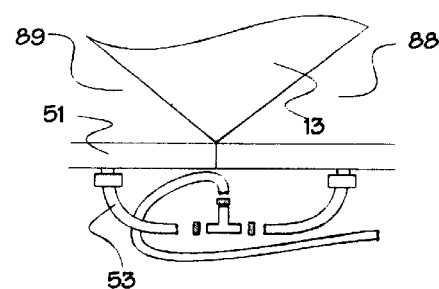
FIG. 14 is an exploded view of the heat recovery ventilation condensate drain assembly.
Figure 15:
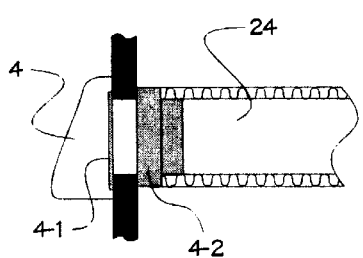
FIG. 15 is an exploded view of a typical outdoor weather hood for exhaust air.
Figure 16:
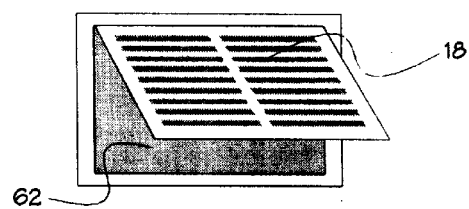
FIG. 16 is an exploded view of a typical kitchen exhaust register complete with grease catching filter.

Issues Related the HRV and Humidification Sections:

Stale air is drawn from strategically located vents 28 and 62 within the living area and is sent outside while fresh air is simultaneously being pulled into the building at the same rate. The heat in the stale air is transferred to the fresh incoming air. Differing rates of ventilation can cause problems with negative or positive pressure in the living space. The rates of ventilation or air changes are initially balanced. The specific rates of ventilation are listed in the local building codes. At start-up the balancing is done by using the manual balancing dampers 52, located in the indoor stale air duct 1 and the other 33, located in the fresh air intake duct 23. For example a restaurant, pub or tavern will have a very different rate than a residence. We use a dedicated stale air exhaust fan 17 because the mixing of the fresh and stale air can cause a problem with odors being transferred from the moist air areas to the rest of the living space, which is obviously undesirable. Although some cross leakage will occur the amount as a percentage of the total is quite low. The two air streams do not cross paths in the same air passage. The two air streams are separated by a passive cross flow heat exchange core (PCAAHEC) 13. The stale air is drawn from stale air registers 35 and 62 which are commonly located in the kitchen 62, bathrooms 35, laundry rooms 35 and other moist air areas within the residence. This will cause a slight negative pressure in those areas within the living space thereby causing odors to stay in those areas for exhaust, as compared to wafting throughout the other living spaces. In certain climates where the temperature is low and cool, re-humidification will be desirable because the HRV's constant operation can dry the air in the winter. The geothermal or compression based heating, cooling system 22 will have little affect on a relative humidity increase or decrease because it is already designed with longer run periods with low differential temperatures at the coil. This will be accomplished by installing an atomizing humidification system, as shown in FIG. 13 within the integrated package. The humidification system would include an atomizing tube 49 connected to a solenoid valve 50 which opens and closes based on a low humidity level, as sensing by the unit mounted humidistat 45 in the winter. Re-humidification would only be used in the heating season where dehumidification would be accomplished in the summer months by the evaporator air coil 5 and the HRV system. However, since a refrigeration based condensing air coil 5 is used in the heating mode within the compression based heating, cooling system 22, re-humidification can be accomplished by simply atomizing a small quantity of water on the down stream side of the coil, but again only when the heating system 22 is operating. The atomized water will flow to the coil and evaporate because the air coil will be warmed at least 25 degrees F. above the incoming air temperature. A difference of 25 degrees F. in air temperature will cause immediate vaporization or evaporation when the cool water heats the warm coil. In the summer the humidification system would not be required because a continuous running HRV will actually help to reduce air conditioning run times by dehumidifying the air.

Every living space environment has odors, fumes and humidity. In addition to recovering heat, the integrated system can add or expel excess moisture as needed. This will help to maintain a comfortable humidity level inside the house during the colder winter months, while preventing excess humidity from entering in the summer months. The heat exchange process recovers heat in the winter months while rejecting heat in the summer months. It also will cause humidity to drop out and be sent to the condensate drain for removal from the indoor environment.

As best illustrated in FIGS. 1 and 2, stale air is drawn into the indoor stale air registers 35 located in the bathrooms, and other moist air areas by a dedicated stale air exhaust fan 17. The kitchen stale air register 62 would include a grease catcher filter 51 right at the register 28. The stale air is drawn through the flexible non-insulated indoor stale air ducting 1, then travels over the dedicated stale air fan 17, pulling any energy that is available by the nature of the dedicated stale air fan 17 operation. The stale air then travels through a basic particulate, stale air heat recovery core filter 20 continuing through the primary passive cross flow air-to-air heat exchanger core (PCAAHE) 13. As the stale air flows through the PCAAHE 13, its heat energy is transferred to the cooler fresh air, which is passing simultaneously on the opposite side of the PCAAHE 13. The stale air transfers a majority (approximately 70%, depending on outdoor air temperatures) of its pre-heated or pre-cooled energy to the fresh incoming air.

The stale air would then travel through the secondary active reversible evaporator/condenser coil 10, if it is installed for high efficiency operation. The stale air would transfer energy to the cooler evaporator coil 10, offering higher efficiencies to the (see "High Efficiency Secondary Active Evaporator/Condenser Heat Exchanger Coil" below).

It is then transferred through the insulated stale air exhaust ducting 24. Then through the bird screen 4-1 within the outdoor stale air exhaust weather hood 4 to the outdoors.

As the stale air is flowing through the system, the fresh outdoor air is simultaneously being drawn in through a bird screen 7-1, located in the outdoor fresh air intake vent hood 7. The fresh air then flows into the insulated fresh air intake duct 23 from outside by the negative pressure created by the indoor air distribution blower 12. The fresh air is drawn at the same rate as the stale air, modulated by a weight adjustable modulating pressure differential air balancing device 27, located at the entrance to the indoor return and fresh air mixing chamber (mixing chamber) 14. The fresh air travels in from outside and into the insulated fresh air intake duct 24, then travels into the heat recovery ventilation (exchange) chamber 16, then travels through the basic particulate fresh air heat recovery core filter 21, then into the fresh air side of PCAAHE 13. The fresh air picks up heat (energy) from the stale air as it crosses through the PCAAHE 13. The fresh air travels to the indoor return and fresh air mixing chamber 14 and picks up any available energy as it travels over the compressor and other electrical components. It is mixed with air that is drawn in from the main indoor return air duct 3 from the living space. After the fresh and return air has been thoroughly mixed, it then travels through the air coil 5. If the living space thermostat is calling for heating or cooling. The air is then heated or cooled at the indoor reversible evaporator/condenser, Freon to air, direct exchange, air coil 5 and then transferred to the supply air duct 2 and sent to each room via the indoor supply air registers 28. The pre-mixed fresh and heated or cooled air is then sent evenly to each room in the residence through the supply air registers 28 located in each room of the living space.

High Efficiency Secondary Active Evaporator/Condenser Heat Exchanger Coil

If the optional, high efficiency secondary active evaporator/condenser heat exchanger coil 10 is installed, and the compression based heating cooling system 22 is in the heating mode. The sensible temperature of 10 would be at approximately 30 degrees F., while the stale air would be at a higher temperature. Therefore any available heat that is left in the stale air would transfer via the Freon within the compression-based heating and cooling system 22 for further recovery and would be sent directly to the compressor 44 within the compression based heating and cooling system 22, and ultimately transferred to the space. If the outdoor temperature drops below a preset limit as measured by the temperature sensor 19 located in the fresh air supply area of the HRV chamber 16, a bypass valve will switch 10 off while 22 is operating. The common outdoor temperatures in the various geographical locations would dictate the positioning of 10. If the optional high efficiency secondary active evaporator/condenser heat exchanger coil 10 is installed. And the compression based heating cooling system 22 is off, then 10 will have no effect as it is designed for active operation only.

The Heating Mode:

As best illustrated in FIG. 1, when the central wall mounted thermostat 76 calls for heating the compression based heating/cooling system 22 will start in the heating mode. The heating mode will start all necessary components to cause heating and air flow. The HRV will already be on in continuous operating mode. The occupied space air at approximately 70 degrees F., is drawn to the compression based heating, cooling or geothermal heat pump 22 by a negative pressure that is caused by the indoor air distribution blower 22 and the main blower motor 54 within the refrigeration chamber 63. The air is drawn from high or low mounted return air registers 29, then follows inside the return air duct 3, leading to the return air filter 30. The room air then enters the indoor return and fresh air mixing chamber 14. The air will then flow across the refrigeration components within the refrigeration chamber 63. The air will then mix within the mixing chamber 14, it will turbulate and mix with the fresh air that is flowing in from the fresh air induction port 68. As best illustrated in FIGS. 2, 7, 8 and 9, as the air is mixing it will flow across and around the, compressor 44, the four-way valve, filter/drier 42 and sight glass moisture indicator 43, taking any heat or energy that is available to the air stream prior to being heated or cooled. Flowing across the aforementioned components will heat the air up by approximately 3 degrees F. The air will also flow past the unit mounted humidistat 45, as shown in FIG. 2. The air will also flow across the fan blower motor 54 as it enters the main fan blower 12. The air will then be then sent to the indoor positive pressure chamber 70 to be heated by the compression based heating and cooling system as shown in FIGS. 7, 8 and 9.

If the sensor on the unit mounted humidistat 45 senses the humidity level below 45%, it will send a signal to the humidifier solenoid 50, and the solenoid will open. This will cause water to flow in from the external connection for humidifier 57, through the humidifier solenoid 50, and will fill the humidifier atomizing tube(s) 49. Thereby adding humidity to the air stream prior to flowing through the indoor air coil. Since the system is in the heating mode, the indoor air coil 5 will be in the condensing mode and will be warmed to approximately 100 degrees F. causing the atomized water to immediately evaporate and transfer to the heated air.

The 70 to 73 degree F. air, with or without added humidity, will then be forced through the indoor air coil 5. The air will be heated to approximately 100 degrees F. Then if necessary, the heated and/or pre-humidified air will travel through the hydronic or electric backup/emergency heat cavity 48, for second stage heating. The air will then travel through the main indoor supply duct 2 and will travel inside the ducting to the supply air registers 28 located in each room or zone of the space.

Exhaust and Energy Recovery:

A dedicated stale air exhaust fan 17, draws indoor stale air into the stale air indoor duct 1. Via strategically located indoor supply air registers 28, located in the bathroom, laundry room, (moist/stale air areas), and also located in the kitchen 62 complete with a grease catching filter 18 and any other ducted sources of pollutants. Then the stale airflows into the indoor stale air duct 1 through the indoor stale air filter 18, then travels into the heat (energy) exchange chamber 16. Then when the compression based liquid-to-liquid or air-to-air heating/cooling chamber (heating cooling system) 22 is on in the heating mode the air enters the heat (energy) exchange chamber 16. The stale air will travel through the liquid to air evaporator/condenser primary heat exchanger 10 which will be in the evaporative mode. The liquid to air evaporator/condenser primary heat exchanger 10 (evaporator) will be much cooler then the stale air therefore the heat will travel from the stale air to the cold Freon within the evaporator and will carry the heat to the indoor evaporator/condenser (liquid to air—heating/cooling) 5, which will be in the condenser mode and send it into the occupied space air thereby increasing the efficiency of the heating/cooling system 22. After the stale air has traveled through the liquid to air evaporator/condenser primary heat exchanger 10 it will then travel through the energy exchange stale air channel 26 (see FIG. 3), and then any remaining heat will be transferred to the fresh air via the energy exchange fresh air channel 25 (see FIG. 3) within the passive, cross flow air-to-air heat exchanger 13. After the heat has been removed the stale air, it will then travel through the stale air exhaust duct 24 to be exhausted outside of the space. If the outside air temperature is at or below −5 C. or 23 F., the defrost mode will come into affect and one of two things will happen or a combination of both depending on the conditions that exist indoors and outdoors. If the outdoor temperature is below a prescribed limit and if the heating system is off, the defrost sensor 19 will sense the low temperature, and close the incoming fresh air damper 33. If the unit is on in the heating mode the defrost sensor 19 will sense the low temperature, and open the hot air intake variable defrost device 46. Allowing heated air to circulate into the fresh air, mixing with and increasing the temperature of the fresh air prior to traveling through the passive cross flow, air-to-air heat exchanger 13. Thereby allowing the unit to operate at much lower temperatures than prior art without allowing freeze up at the passive cross flow, air-to-air heat exchanger 13.

If the compression based heating/cooling system (heating cooling system) 22 is on in the cooling mode: a different set of conditions will apply. In the cooling mode the air enters the heat (energy) exchange chamber 16 and the since heating/cooling system 22 is on in the cooling mode, the stale air will travel through the liquid to air evaporator/condenser primary heat exchanger 10 which will be in the condenser mode. Since the heating/cooling system 22 is on in the cooling mode, the Freon in the condenser will be much warmer then the stale air. Heat will travel from the warm Freon to the stale air, the cooled Freon will travel to the evaporator in the heating/cooling system 22 and will be applied to the occupied space air thereby increasing the efficiency of the heating/cooling system 22. After the stale air has traveled through the liquid to air evaporator/condenser primary heat exchanger 10, and has been heated. It will then travel through the energy exchange stale air channel 26 (see FIG. 3), and any remaining pre-cooled stale air temperature will be transferred to the fresh air via the energy exchange fresh air channel 25 (see FIG. 3) within the passive cross flow air-to-air heat exchanger 13.

However, if the heating/cooling system 22 is not operating, the stale air will travel through the PCAAHE 13, recovering heat/cool energy which is then transferred to the incoming fresh air. Using a cross flow heat exchanger (PCAAHE) 13 virtually eliminating the opportunity for cross flow contamination. The stale air is then ducted through the stale air exhaust duct 24 then directly outside the conditioned space. The direct stale air exhaust eliminates any possibility of transferring any smells from the bathroom, kitchen and laundry room to other occupied areas.

In summary, if the liquid to air or geothermal 22 (see FIGS. 7 and 8) or air-to-air 22 (see FIG. 9) compression based heating or cooling system 22 (see FIGS. 7–9) is operating, the stale air will pass through the liquid to air evaporator/condenser secondary heat exchanger 10 arrangement causing a change to the outflow temperature after traveling through the passive cross flow, air-to-air heat exchanger (PCAAHE) 13. Greatly increasing the efficiency of both the heat recovery ventilation system and the compression based heating/cooling system 22 (see FIGS. 7–9).

After the fresh air travels through the heat exchange process, it then travels through the modulating pressure differential air balancing flow device 27 and is mixed with the occupied space return air. The indoor return air is drawn from the return air registers 29 through the indoor return air duct, past the return air filter 3, and then through the indoor evaporator/condenser (liquid to air—heating/cooling) 5, then into the indoor return and fresh air mixing chamber 14, via negative pressure, created by the same indoor air distribution fan 12. As both the occupied space, indoor return air, and the fresh air have been drawn into the same indoor fresh and return air mixing chamber, 14 and aggressively mixed, the Indoor air distribution fan 12 then distributes the mixed air to the indoor supply air duct 2. Which in turn sends the mixed air to the individual room supply air registers 28. Offering evenly distributed mixed air to each area within the occupied space. The modulating pressure differential air balancing device 27 is used to maintain balanced pressure/flow between the incoming and outgoing air, to dictate a slight positive pressure in the occupied space.

The preferred embodiment of the invention includes:

a reversible geothermal heating, cooling heat pump complete with on-board humidification and with mid or high efficiency energy recovery system a reversible air-to-air heating, cooling heat pump complete with on-board humidification and with mid or high efficiency energy recovery system a liquid cooled air conditioner complete with on-board humidification and with mid or high efficiency energy recovery system a hydronic air handler and liquid cooled air conditioner complete with on-board humidification and with mid or high efficiency energy recovery system an electric forced air heat and air-to-air, air conditioner complete with on-board humidification and with mid or high efficiency energy recovery system a propane fired forced air heat and air-to-air, air conditioner complete with on-board humidification and with mid or high efficiency energy recovery system an oil fired forced air heat and air-to-air, air conditioner complete with on-board humidification and with mid or high efficiency energy recovery system a natural gas fired forced air heat and air-to-air, air conditioner complete with on-board humidification and with mid or high efficiency energy recovery system The key to the efficiency increases is based on the fact that the invention uses a compression based system which allows for increased efficiency, based on the fact that the invention can use primary and secondary exchange. The primary and secondary exchange allows for increased efficiency because the invention couples the compression system with the passive heat exchanger, thereby increasing the ability to exchange energy by the two exchange methods. The existing technology uses only passive exchange. Passive exchange is limited. Evaporative and condensing exchange methods are much more aggressive and capable of energy exchange. By marrying the two methods we are essentially increasing the efficiency on both systems. The HRV increase would be an increase of about 10 to 15% over traditional passive methods, and the compression based (heating/cooling) side would increase by approximately 5 to 7%.

The remote compression system, as shown in FIG. 5, offers the benefit of remote installation. The integrated split system would offer all the benefits and operational parameters of all other unitary designs, as best shown in FIGS. 1 and 2.

For greater clarity, Table 1 below lists the various parts and components shown in the drawings:

TABLE 1

Description of Parts and Components

| Ref. no. | Description |
|---|---|
| 1 | flexible non-insulated indoor stale air duct - from moist air areas |
| 2 | main indoor supply air duct from system |
| 2-1 | main indoor supply air duct canvass noise reduction connection |
| 2-2 | main indoor supply air noise reduction insulation |
| 3 | main indoor return air duct to system |
| 3-1 | main indoor return air duct canvass noise reduction connection |
| 4 | outdoor stale air exhaust weather hood |
| 4-1 | outdoor stale air exhaust weather hood bird screen |
| 4-2 | outdoor stale air exhaust weather hood collar wall connection |
| 5 | indoor reversible evaporator/condenser (Freon to air) - air coil |
| 5-1 | regrigeration line in or out - to or from indoor reversible evaporator/condenser (Freon to air) air coil |
| 5-2 | regrigeration line in or out - to or from indoor reversible evaporator/condenser (Freon to air - direct exchange) air coil |
| 6 | absorption/rejection evaporator/condenser Freon to liquid - indoor water coil |
| 6-1 | refrigeration line in or out - to or from absorption/rejection evaporator/condenser (Freon to liquid - indoor water coil |
| 6-2 | refrigeration line in or out - to or from absorption/rejection evaporator/condenser Freon to liquid - indoor water coil |
| 7 | outdoor fresh air intake weather hood |
| 7-1 | outdoor fresh air intake weather hood bird screen |
| 7-2 | outdoor fresh air intake weather hood collar wall connection |
| 8 | absorption/rejection evaporator/condenser air to Freon outdoor air coil - air to air system |
| 9 | electronic controls system c/w on-board diagnostics |
| 10 | secondary, high efficiency, active reversible, vapor compression evaporator/condenser heat exchanger |
| 10-1 | refrigeration line in or out - to or from secondary, high efficiency, active reversible evaporator/condenser heat exchanger |

TABLE 1-continued

Description of Parts and Components

| Ref. no. | Description |
|---|---|
| 10-2 | refrigeration line in or out - to or from secondary, high efficiency, active reversible evaporator/condenser heat exchanger |
| 11 | internally trapped coupled condensate drain line |
| 11ah | Externally trapped coupled condensate drain line for a split system |
| 12 | indoor air distribution blower |
| 13 | primary, passive, cross flow air to air heat exchanger core (PCAAHEC) |
| 14 | indoor return & fresh air mixing chamber |
| 15 | room thermostat |
| 16 | heat recovery ventilation (energy) exchange chamber |
| 16-1 | heat recovery ventilation (energy) exchange chamber insulated door |
| 17 | dedicated stale air exhaust fan |
| 18 | indoor grease catcher kitchen stale air filter |
| 19 | defrost sensor |
| 20 | stale air heat recovery core particulate filter |
| 21 | fresh air heat recovery core particulate filter |
| 22 | compression based heating & cooling system or a reversible, mechanical vapor compression system or heat pump, FIG. 6, 7, 8, 9. liquid to air - air to liquid - air to air - heating/cooling unitary system |
| 22cs | compression based heating & cooling system or a reversible, mechanical vapor compression system or a heat pump, FIG. 5. liquid to air - air to liquid - air to air - heating/cooling system - Compressor section for a split system |
| 22ah | compression based heating & cooling system or a reversible, mechanical vapor compression system or a heat pump, FIG. 5. liquid to air - air to liquid - air to air - heating/cooling system - Air Handling Section For a Split System |
| 22rp | mechanical vapor compression system piping for a split system FIG. 5 |
| 23 | insulated fresh air intake duct |
| 24 | insulated stale air exhaust duct |
| 25 | non-insulated indoor stale air duct |
| 26 | defrost port - from "fresh intake to exhaust chamber" or from "fresh air intake to space" |
| 27 | adjustable, weighted modulating pressure differential air balancing device |
| 28 | indoor supply air registers |
| 29 | indoor return air registers |
| 30 | indoor return air filter |
| 31 | system cabinet |
| 31ah | Remote direct expansion, "DX" system cabinet for split system |
| 31cs | Remote Compression section system cabinet for split system |
| 32 | domestic hot water tank |
| 33 | incoming fresh air balancing damper |
| 34 | brass cross for link from desuperheater within system to domestic hot water tank |
| 35 | indoor stale air registers from moist air areas, not including kitchen |
| 36 | loop pump(s) for closed loop operation |
| 37 | 3 way loop purging valve(s) for purging closed loop system |
| 38a | underground energy source inflow piping |
| 38b | underground energy source discharge piping |
| 39 | hot water piping from desuperheater within system to domestic hot water tank |
| 40a | main bi-flow tx valve |
| 40a-1 | refrigeration piping outgoing or incoming to or from main bi-flow tx valve |
| 40a-2 | refrigeration piping outgoing or incoming to or from main bi-flow tx valve |
| 40b | main bi-flow tx valve temperature sensing bulb |
| 41 | 4 way reversing valve |
| 41-1 | refrigeration piping outgoing or incoming to or from 4 way reversing valve |
| 41-2 | refrigeration piping outgoing or common suction line from 4 way reversing valve |
| 41-3 | refrigeration piping outgoing or incoming to or from 4 way reversing valve |
| 41-4 | refrigeration piping incoming hot gas line to 4 way valve |
| 42 | filter/drier |
| 43 | sight glass & moisture indicator |
| 44 | Compressor |
| 44-1 | high pressure gas refrigeration line out of compressor |
| 44-2 | low pressure gas suction line in to compressor |
| 45 | unit mounted humidistat |
| 46 | hot air intake variable defrost device |
| 47 | hot air bypass defrost tube |
| 48 | hydronic or electric back-up/emergency heat cavity |
| 49 | humidifier atomizing tube(s) |
| 50 | humidifier solenoid (24v) - opens on hunidistat call |
| 51 | HRV drain pan |
| 52 | incoming stale air damper |
| 53 | HRV condensate drain assembly |
| 54 | main blower motor |
| 55 | internal air coil drain pan |
| 56a | standard 70 f warm or 100 f pre-heated air 24 v motorized defrost damper |
| 56b | optional 70 f air, space air port 24 v motorized defrost damper |
| 56c | optional 70 f air, exhaust air port 24 v motorized defrost damper |
| 57 | external connection for humidifier |
| 58 | external connection for condensate drain |
| 59 | external connection for water out looop or well |
| 59-1 | water line out of water coil to loop or well |
| 60 | external connection for water in loop or well |
| 60-1 | water line in to water coil from loop or well |
| 61 | desuperheater water coil |
| 61-1 | water line from domestic hot water tank to desuperheater water coil |
| 61-2 | water line to desuperheater water coil from domestic hot water tank |
| 61-3 | refrigeration high pressure, hot gas line from desuperheater water coil |
| 61-4 | refrigeration high pressure, hot gas line in to desuperheater water coil |
| 62 | kitchen exhaust register |
| 63 | refrigeration chamber for a unitary system |
| 63cs | refrigeration chamber for a split system |
| 63ah | refrigeration chamber for a split system |
| 64 | drain pan over flow sensor |
| 65 | secondary bi-flow accumulator |
| 65-1 | refrigeration piping outgoing or incoming to or from secondary bi-flow accumulator |
| 65-2 | refrigeration piping outgoing or incoming to or from secondary bi-flow accumulator |
| 66 | main accumulator |
| 66-1 | refrigeration low pressure line out of main accumulator |
| 66-2 | refrigeration low pressure line into main accumulator |
| 67a | secondary bi-flow tx or cap line air coil |
| 67a-1 | refrigeration piping outgoing or incoming to or from secondary tx or cap line air coil |
| 67a-2 | refrigeration piping outgoing or incoming to or from secondary tx or cap line air coil |
| 67b | secondary bi-flow tx line suction line temperature sensor |
| 68 | fresh air induction port |
| 70 | indoor air coil positive pressure chamber |
| 71 | desuperheater water pump |
| 72 | external connect for desuperheater incoming water flow |
| 73 | external connect from desuperheater - outgoing water flow |
| 74 | water coil side t to connect optinal high efficiency secondary active recovery system |
| 75 | air coil side t to connect optional high efficiency secondary active recovery system |
| 76 | central thermostat, 2 stage heat, one stage cool |
| 77 | desuperheater high limit switch thermodisc |
| 78 | incoming desuperheater water line |
| 79 | outgoing desuperheater water line |
| 80 | 24v motorized zone valve for well geothermal system |
| 81 | a/c head pressure control to regulate well system a/c water flow rate |
| 82 | pressure regulating valve for to modulate flow with well system |
| 83 | pressure gauge |
| 84 | flow meter |
| 85 | outdoor air to air blower |
| 85-1 | outdoor air to air blower motor |
| 86 | outdoor air to air defrost sensor |
| 87 | incoming fresh air channel to PCAAHE 13 |
| 88 | incoming stale air channel to PCAAHE 13 |

TABLE 1-continued

Description of Parts and Components

| Ref. no. | Description |
| --- | --- |
| 89 | incoming fresh air channel to PCAAHE 13 |
| 90 | incoming fresh air channel to PCAAHE 13 |
| 91 | optional exhaust defrost bypass port |
| 92 | stale air chamber |
| 93 | optional 70 f space air defrost port |
| 94 | optional positive pressure defrost port |

What is claimed as the invention is:

1. An integrated forced air heating, cooling, and heat recovery ventilation apparatus for a space, said apparatus comprising, in combination within one system:
   a stale air return inlet connectable to stale air return ducting, a stale air exhaust outlet connectable to stale air exhaust ducting, a fresh air inlet connectable to fresh air inlet ducting, a fresh air outlet connectable to an indoor supply air duct, and an air-to-air heat exchanger connected to said stale and fresh air elements to exchange heat between stale air and fresh air;
   a mixing chamber, for proportionately mixing indoor return air and fresh air to be returned to said space as occupied space return air;
   an indoor blower, for drawing indoor return air into said mixing chamber and at the same drawing fresh air through said air-to-air heat exchanger via said fresh air inlet and said fresh air inlet ducting into said mixing chamber;
   a weighted modulating air damper device, arranged to modulate the flow rate of the fresh air drawn into said mixing chamber via said air-to-air heat exchanger;
   a mechanical vapor compression based heating and cooling means positioned between an indoor return air duct and said indoor supply air duct, for selectively heating or cooling air; and
   a heat recovery ventilation system, wherein stale air is drawn into said indoor stale air return ducting by a dedicated stale air exhaust fan, continuing through said air-to-air heat exchanger where the heat energy of the stale air is transferred to the cooler fresh air to eventually be expelled to the outside of said space via said stale air exhaust ducting and said stale air exhaust outlet, so that stale air is not mixed with fresh air nor with occupied space return air, and where said mixing chamber further mixes and distributes heated or cooled fresh air from said heat recovery ventilation system and said vapor compression system.

2. Apparatus as recited in claim 1, where said system is unitary, having said vapor compression based heating and cooling means integrated with rest of the apparatus.

3. Apparatus as recited in claim 1, where said system is split, with said vapor compression based heating and cooling means located in a lower portion of said space and said mixing chamber with related inlet and outlet means in an upper section of said space.

4. Apparatus as recited in claim 1, where said mechanical vapor compression based heating and cooling means comprises a geothermal closed loop means using a closed underground loop as an energy source and transferred to the space through a vapor compression heat pump system.

5. Apparatus as recited in claim 1, where said mechanical vapor compression based heating and cooling means comprises a geothermal open well means using an open well or water as an energy source and transferred to the space through a vapor compression heat pump system.

6. Apparatus as recited in claim 1, where said mechanical vapor compression based heating and cooling means comprises a geothermal heat pump absorbing and rejecting energy from a water source using an open or internal closed loop water supply as an energy source and transferred to the space through a vapor compression heat pump system.

7. Apparatus as recited in claim 1, where said mechanical vapor compression based heating and cooling means comprises air to air heat pump using outdoor air as an energy source and transferred to the space through a vapor compression heat pump system.

8. Apparatus as recited in claim 1, where said air-to-air heat exchanger comprises a primary passive heat exchanger core.

9. A system as recited in claim 1, further comprising an integrated humidification system.

10. Apparatus as recited in claim 1, further comprising a reversible evaporator/condenser secondary heat exchanger.

11. Apparatus as recited in claim 10, further comprising a reversible evaporator/condenser secondary heat exchanger.

12. Apparatus as recited in claim 1, further comprising a hot air quick defrost system.

13. Apparatus as recited in claim 1, further comprising an integrated condensate drain assembly for said mechanical vapor compression based heating and cooling means and said heat recovery ventilation system.

* * * * *